(12) United States Patent
Lucon et al.

(10) Patent No.: US 11,110,413 B2
(45) Date of Patent: *Sep. 7, 2021

(54) MECHANICAL SYSTEM THAT FLUIDIZES, MIXES, COATS, DRIES, COMBINES, CHEMICALLY REACTS, AND SEGREGATES MATERIALS

(71) Applicant: Resodyn Corporation, Butte, MT (US)

(72) Inventors: Peter A. Lucon, Butte, MT (US); Lawrence C. Farrar, Butte, MT (US)

(73) Assignee: Resodyn Corporation, Butte, MT (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/451,845

(22) Filed: Jun. 25, 2019

(65) Prior Publication Data
US 2019/0321795 A1    Oct. 24, 2019

Related U.S. Application Data

(60) Continuation of application No. 16/157,919, filed on Oct. 11, 2018, now Pat. No. 10,335,749, which is a
(Continued)

(51) Int. Cl.
*B01F 11/00* (2006.01)
*B01J 2/00* (2006.01)
(Continued)

(52) U.S. Cl.
CPC ...... *B01F 11/0025* (2013.01); *B01F 11/0022* (2013.01); *B01F 13/0059* (2013.01);
(Continued)

(58) Field of Classification Search
CPC ................ B01F 11/0022; B01F 11/0031
(Continued)

(56) References Cited

U.S. PATENT DOCUMENTS 3,045,984 A   7/1962   Cochran
3,089,824 A   5/1963   Wurster
(Continued)

FOREIGN PATENT DOCUMENTS

CN   103585943 A   2/2014
DE      948820 C   9/1956
(Continued)

OTHER PUBLICATIONS

Office Action dated Jun. 15, 2020 in U.S. Appl. No. 15/686,784.
(Continued)

*Primary Examiner* — David L Sorkin
(74) *Attorney, Agent, or Firm* — McDermott Will & Emery LLP

(57) ABSTRACT

The present application is directed towards systems for adding components to materials being fluidized in a vibratory mixer by use of atomizers or sprayers. A mechanical system can fluidizes, mix, coat, dry, combine, or segregate materials. The system may comprise a vibratory mixer, mixing vessel containing a first material and a sprayer to introduce a second material. The vibratory mixer may generate a fluidized bed of a first material and the sprayer, coupled to the mixing vessel, may introduce a second material onto the fluidized bed to mix the materials in a uniform and even fashion.

11 Claims, 35 Drawing Sheets

Related U.S. Application Data division of application No. 14/402,205, filed as application No. PCT/US2013/043755 on May 31, 2013, now Pat. No. 10,130,924.

(60) Provisional application No. 61/689,256, filed on May 31, 2012.

(51) Int. Cl.
| | | |
|---|---|---|
| *B01J 2/04* | (2006.01) | |
| *B01J 2/18* | (2006.01) | |
| *B01F 13/00* | (2006.01) | |
| *B01F 15/00* | (2006.01) | |
| *B01F 15/02* | (2006.01) | |
| *B01F 15/06* | (2006.01) | |

(52) U.S. Cl.
CPC .. *B01F 15/00175* (2013.01); *B01F 15/00207* (2013.01); *B01F 15/00357* (2013.01); *B01F 15/0254* (2013.01); *B01F 15/06* (2013.01); *B01J 2/006* (2013.01); *B01J 2/04* (2013.01); *B01J 2/18* (2013.01); *B01F 11/0031* (2013.01); *B01F 2015/061* (2013.01)

(58) Field of Classification Search
USPC .................................................. 366/110–112
See application file for complete search history.

(56) References Cited

U.S. PATENT DOCUMENTS

| | | | |
|---|---|---|---|
| 3,200,567 A | 8/1965 | May | |
| 3,237,596 A | 3/1966 | Grass, Jr. et al. | |
| 3,353,796 A * | 11/1967 | Roberts | B24B 31/06 29/90.01 |
| 3,436,873 A * | 4/1969 | Biebel | B24B 31/00 451/35 |
| 3,507,686 A * | 4/1970 | Hagenbach | G03G 9/1131 430/111.1 |
| 3,826,740 A | 7/1974 | Jewett | |
| 4,070,503 A | 1/1978 | Robert et al. | |
| 4,493,556 A | 1/1985 | Prew | |
| 4,848,673 A | 7/1989 | Masuda et al. | |
| 5,395,592 A | 3/1995 | Bolleman et al. | |
| 5,459,318 A | 10/1995 | Cacho et al. | |
| 5,460,209 A | 10/1995 | Jandura et al. | |
| 5,473,700 A | 12/1995 | Fenner, Jr. | |
| 5,836,683 A | 11/1998 | Moon et al. | |
| 6,244,738 B1 | 6/2001 | Yasuda et al. | |
| 6,361,747 B1 | 3/2002 | Dion et al. | |
| 6,607,008 B1 | 8/2003 | Yoshimoto et al. | |
| 7,188,993 B1 | 3/2007 | Howe et al. | |
| 10,130,924 B2 * | 11/2018 | Lucon | B01F 11/0025 |
| 2003/0044332 A1 | 3/2003 | Conrad et al. | |
| 2003/0201562 A1 | 10/2003 | Lease | |
| 2006/0266967 A1 | 11/2006 | Niura | |
| 2007/0267351 A1 | 11/2007 | Roach et al. | |
| 2008/0051936 A1 * | 2/2008 | Lindblom | B01F 13/1069 700/239 |
| 2009/0038932 A1 | 2/2009 | Denslow et al. | |
| 2010/0096936 A1 | 4/2010 | Bae et al. | |
| 2012/0121469 A1 | 5/2012 | Hiller et al. | |

FOREIGN PATENT DOCUMENTS

| | | |
|---|---|---|
| DE | 1063123 B | 8/1959 |
| EP | 1402939 A2 | 3/2004 |
| EP | 1972296 A1 | 9/2008 |
| EP | 2103344 A1 | 9/2009 |
| EP | 2793221 A1 | 10/2014 |
| GB | 2056297 A | 3/1981 |
| JP | S45-2510 A | 1/1970 |
| JP | S58223429 A | 12/1983 |
| JP | 63-028434 A | 2/1988 |
| JP | H07-004834 A | 1/1995 |
| JP | H07-019728 A | 1/1995 |
| JP | 10-128094 A | 5/1998 |
| JP | H11248349 A | 9/1999 |
| JP | 2000-501651 A | 2/2000 |
| JP | 2001-293347 A | 10/2001 |
| JP | 2004-123717 A | 4/2004 |
| JP | 2004-230272 A | 8/2004 |
| JP | 2004-337649 A | 12/2004 |
| JP | 2005-060281 A | 3/2005 |
| JP | 2008-183168 A | 8/2008 |
| JP | 2009-277679 A | 11/2009 |
| JP | 2010-005582 A | 1/2010 |
| JP | 2010-515565 A | 5/2010 |
| JP | 2010-539289 A | 12/2010 |
| JP | 2015-217341 A | 12/2015 |
| WO | 2008029311 A1 | 3/2008 |
| WO | 2008103622 A1 | 8/2008 |
| WO | 2011/058881 A1 | 5/2011 |
| WO | 2013089239 A1 | 6/2013 |
| WO | 2015061448 A2 | 4/2015 |

OTHER PUBLICATIONS

Office Action dated Jun. 12, 2019 in U.S. Appl. No. 15/695,784.
Office Action dated Jan. 30, 2020 in U.S. Appl. No. 15/695,784.
Notice of Allowance dated Jun. 12, 2020 in U.S. Appl. No. 15/695,784.
Notice of Allowance dated Sep. 16, 2020 in U.S. Appl. No. 15/695,784.
Notice of Allowance dated Feb. 14, 2019 in U.S. Appl. No. 16/157,919.
Office Action dated Dec. 12, 2019 in U.S. Appl. No. 15/686,784.
Extended European Search Report dated Jun. 17, 2019 in European Patent Application No. 19154132.5.
International Search Report and Written Opinion dated Oct. 24, 2013 in International (PCT) Application No. PCT/US2013/043755.
Invitation to Pay Additional Fees and, Where Applicable, Protest Fee mailed Nov. 13, 2013 in International (PCT) Application No. PCT/US2013/054739.
International Search Report and Written Opinion dated Feb. 18, 2014 in International (PCT) Application No. PCT/US2013/054739.
Office Action dated May 18, 2015 in U.S. Appl. No. 13/965,964 (14 pages).
Office Action dated Dec. 14, 2015 in U.S. Appl. No. 13/965,964 (11 pages).
Office Action dated Apr. 7, 2016 in U.S. Appl. No. 13/965,964 (9 pages).
Office Action dated Oct. 6, 2016 in U.S. Appl. No. 13/965,964 (8 pages).
Office Action dated Mar. 8, 2017 in U.S. Appl. No. 13/965,964 (7 pages).
Notice of Allowance dated Jun. 29, 2017 in U.S. Appl. No. 13/965,964 (7 pages).
Restriction Requirement dated May 25, 2017 in U.S. Appl. No. 14/402,505 (8 pages).
Office Action dated Sep. 7, 2017 in U.S. Appl. No. 14/402,505 (6 pages).
Office Action dated Feb. 20, 2018 in U.S. Appl. No. 14/402,505 (7 pages).
Notice of Allowance dated Jul. 18, 2018 U.S. Appl. No. 14/402,505 (7 pages).
Office Action dated Dec. 12, 2017 in European Patent Application No. 13730092.7.
Office Action dated Oct. 5, 2018 in European Patent Application No. 13730092.7.
Office Action dated Feb. 1, 2016 in Japanese Patent Application No. 2015-515268.
Final Office Action dated Dec. 19, 2016 in Japanese Patent Application No. 2015-515268 dated Dec. 19, 2016.
Office Action issued in Japanese Patent Application No. 2015-528520 dated Nov. 14, 2016, and English translation thereof, 6 pages.

(56) References Cited

OTHER PUBLICATIONS

Office Action issued in Japanese Patent Application No. 2015-528520 dated Mar. 7, 2016, and English translation thereof, 17 pages.
Notice of Allowance in Japanese Patent Application No. 2015-528520 dated Feb. 6, 2017.
Office Action issued in European Patent Application No. 13753377.4 dated Mar. 7, 2016.
Office Action in European Patent Application No. 13753377.4 dated Feb. 6, 2017.
Thayer, Ann M. "Harnessing Microreactions" Chemical & Engineering News, vol. 83, No. 22, pp. 43-52, May 30, 2005. Retrieved from: https://cen.acs.org/articles/83/i22/HARNESSING-MICROREACTIONS.html.
Corning, Inc. "The future flows through Corning® Advanced-Flow™ Reactors" Brochure 2016. Retrieved from: https://www.corning.com/media/worldwide/Innovation/documents/General%20Brochure_WEB.pdf.
International Search Report and Written Opinion dated Oct. 24, 2018 in International (PCT) Application No. PCT/US2018/047890.
International Search Report and Written Opinion dated Nov. 22, 2018 in International (PCT) Application No. PCT/US2018/047788.
Ex Parte Quayle Office Action issued Nov. 27, 2018 in U.S. Appl. No. 16/157,919.
Notice of Allowance dated May 14, 2019 in U.S. Appl. No. 16/157,919.

\* cited by examiner

MECHANICAL SYSTEM THAT FLUIDIZES, MIXES, COATS, DRIES, COMBINES, CHEMICALLY REACTS, AND SEGREGATES MATERIALS

RELATED APPLICATIONS

The present application is a continuation of, and claims the benefit and priority of, U.S. patent application Ser. No. 16/157,919, filed Oct. 11, 2018, which is a divisional of U.S. patent application Ser. No. 14/402,505, filed Nov. 20, 2014, which is the U.S. National Stage of International Application No. PCT/US2013/043755, filed May 31, 2013, which claims priority to U.S. Patent Provisional Application No. 61/689,256, filed on May 31, 2012, entitled "Mechanical System That Fluidizes, Mixes, Coats, Dries, Combines, Chemically Reacts, or Segregates Materials." Each of the foregoing applications is incorporated by reference in its entirety for all purposes.

FIELD

The present application is in the technical field of coating, drying, and mixing particles.

BACKGROUND

Current methods and systems for spray coating applications do not produce uniformly mixed, coated or combined materials. These methods have particular difficulty when trying to coat smaller particles uniformly. Many fluidizers and tumblers do not adequately create a uniform motion to coat the materials evenly. Similarly, current methods for combining materials using chemical reactions are costly and time consuming. Under traditional methods, excess reaction gas can be wasted because the reaction gas is used for both fluidization as well as reaction. This may sometimes require the addition of other materials to create the fluidization using conventional fluidizers. The other materials added with conventional fluidizers would potentially add contaminants, as well as waste materials that would have normally been reacted.

BRIEF SUMMARY

The present application is directed towards mechanical systems and methods that fluidize, mix, coat, dry, combine, chemically react and/or segregate materials utilizing vibratory mixing technology. Vibratory mixing technology provides a unique method to combine, mix, dry, and/or coat materials without the use of mixing blades or impellers. The application uses an acoustic mixer to produce low frequency acoustic energy that mixes materials in a uniform and even fashion. The system further includes a plurality of nozzles, filters, methods to heat and cool, vents, partial and full vacuum vessels, and/or pressure vessels that can be tuned to desired outcomes for various application.

In one aspect, the disclosure is related to a system for spray coating a material. The system includes an acoustic means for generating a fluidized bed in a mixing vessel. The fluidized bed includes a first material. The system also includes a means for spraying a second material into the mixing vessel and onto the fluidized bed. In some implementations, the acoustic means for generating a fluid bed in a mixing vessel is capable of oscillating at a range of about 50 Hz to about 70 Hz.

In some implementations, the system further comprises a means for mixing the first material and the second material in a bulk flow pattern. The vibratory mixing system can be configured to induce both micro-mixing and bulk mixing of the first material and the second material. In some implementations, the micro-mixing can contribute to and facilitate the bulk mixing. In some further implementations, materials can be introduced into the mixing vessel to direct the bulk flow pattern.

The means for spraying may be coupled to the mixing vessel. The means for spraying may introduce the second material to the mixing vessel through the top of the mixing vessel, the side of the mixing vessel, or through the bottom of the mixing vessel. In some implementations, the means for spraying may comprise a plurality of spray nozzles. In other implementations, the system may comprise a means for introducing gas to the mixing vessel.

The system may further comprise a means for controlling the pressure within the mixing vessel. The mixing vessel may be coupled to a vacuum line that provides a vacuum source. In some implementations, the system may further comprise a vent coupled to the mixing vessel. In other implementations, the mixing vessel may be sealed.

The system may further comprise a means for cooling the mixing vessel coupled to the mixing vessel. In some implementations, the system may comprise a means for heating the mixing vessel coupled to the mixing vessel.

In some implementation, the system further comprises a means for detecting mixedness of the first material and the second material in the mixing vessel to determine the current mixing stage. In other implementations, the system of may comprise a means for measuring the temperature of the materials in the mixing vessel.

In another aspect of the present disclosure, the system comprises a mixing vessel containing a first material, a vibratory mixer for generating a fluidized bed in the mixing vessel, and a sprayer for introducing a second material into the mixing vessel. In some implementations the vibratory mixer is capable of oscillating at a range of 50 Hz to 70 Hz.

The vibratory mixer may comprise a driver assembly, said driver assembly being movable in a first linear direction and in an opposite linear direction. The vibratory mixer may also comprise a plurality of motor assemblies comprising a motor having a motor shaft to which an eccentric mass is attached, each of said eccentric masses having a centroid, each of said motor assemblies being rigidly connected to said driver assembly and being adapted to rotate the centroid of its eccentric mass in a plane that is parallel to another plane in which said first direction and said opposite direction lie.

Additionally, the vibratory mixer may comprise a payload assembly, said payload assembly being movable in the same directions as said driver assembly and being movably connected to said driver assembly and configured for placement of the mixing vessel thereon. The vibratory mixer may comprise a plurality of reaction mass assemblies, each reaction mass assembly being movable in the same directions as said driver assembly and being movably connected to said payload assembly. Each of said eccentric masses may have substantially the same weight and inertial properties, and wherein the eccentric masses are rotatable at substantially the same rotational speed in opposite rotational directions and around axes that lie in the same plane and, during rotation, are operative to produce a first force on said driver assembly in said first direction and a second force on said driver assembly in said opposite direction and substantially no other forces on said driver assembly.

The vibratory mixing system may mix the first and second material in a bulk flow pattern. The vibratory mixing system can be configured to induce both mirco-mixing and bulk mixing of the first material and the second material. In some implementations, the micro-mixing can contribute to and facilitate the bulk mixing, which can also be included in the micro-mixing and the bulk mixing.

The sprayer may be coupled to the mixing vessel. In some implementations, a plurality of sprayers may be coupled to the mixing vessel. In other implementations, the system may include a gas sweep feed to introduce a gas to the mixing vessel.

The vibratory mixing system may further comprises a vacuum line to provide a vacuum source. The fluidized bed may be generated by using a partial vacuum, full vacuum or high pressure in the mixing vessel.

In some implementations, the vibratory system may comprise a vent coupled to the mixing vessel. In other implementations, the mixing vessel may be sealed to create pressure in the mixing vessel. Additionally, a pressure relief valve may included in the system to control pressure levels in the mixing vessel. In some implementations, the system may further comprise a filter coupled to a vent, pressure relief valve or a vacuum line.

The vibratory mixing system may further comprise a cooling jacket coupled to the mixing vessel for cooling the mixing vessel. In some implementations, the system may comprise a heating jacket coupled to the mixing vessel for heating.

In some implementations, the vibratory mixing system may comprise a near infrared (NIR) sensor to detect mixedness of the first material and the second material in the mixing vessel. The NIR sensor may determine the current mixing stage of the materials during operation. The vibratory system may comprise a temperature measuring device to detect the temperature of the materials in the mixing vessel.

In another aspect of the present disclosure, a method for vibratory mixing a combination of materials is described. The method includes generating, by a vibratory mixer, a fluidized bed in a mixing vessel, the fluidized bed comprising a first material. The vibratory mixer may be capable of oscillating at a range of 50 Hz to 70 Hz. The method also includes spraying, by a sprayer, a second material into the mixing vessel and onto the fluidized bed. The sprayer may be coupled to the mixing vessel. The method further includes controlling the pressure in the mixing vessel by at least one of a vent, vacuum, pressure relief valve and seal. The method also includes detecting the mixedness, by a near-infrared sensor, of the first and second material in the mixing vessel.

BRIEF DESCRIPTION OF THE FIGURES

The foregoing and other objects, aspects, features, and advantages of the invention will become more apparent and better understood by referring to the following description taken in conjunction with the accompanying drawings, in which:

FIG. 23-24A are illustrative examples of various implementations of a vibratory mixing system;

DETAILED DESCRIPTION OF THE INVENTION

Figure 1:
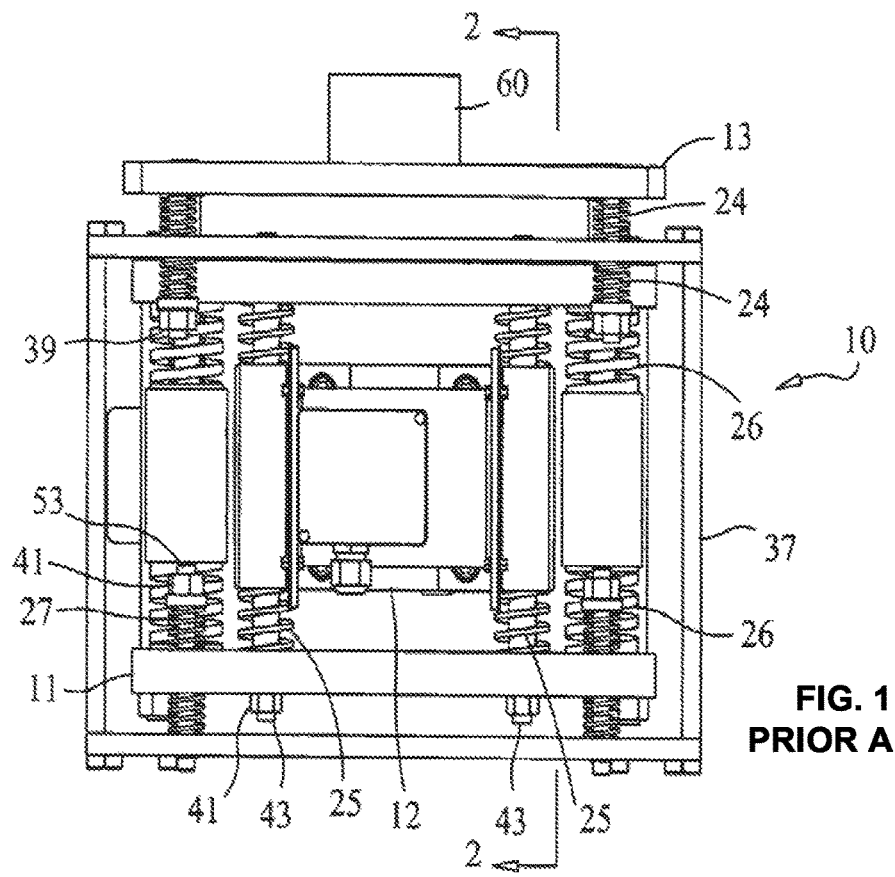
FIG. 1 is a front elevation view of a flat plate resonant mixer.

FIGS. 1-4, show various views of examples of flat plate resonant mixer 10. The resonant mixer 10 includes three independent movable masses (intermediate mass 11, oscillator mass 12 and payload 13) and four distinct spring beds or spring systems (payload mass to ground springs 24, oscillator to intermediate mass springs 25, intermediate mass to payload springs 26 and intermediate mass to ground springs 27) that are housed in a rigid structure 7. The oscillator mass 12 is situated between the other two masses. The intermediate mass 11 is situated below the oscillator mass 12. The payload 13 is situated above the oscillator mass 12. In some implementations, all of the masses are constructed of steel or some comparable alloy.

The oscillator mass 12 is rigidly connected to two oscillator drives 38 (e.g., two direct current (DC) servo motors) and is movably connected to the intermediate mass 11 by the oscillator to intermediate mass alignment struts 43, the oscillator to intermediate mass springs 25, two retainers 40 and two locking nuts 41. The intermediate mass 11 is movably connected to the rigid structure 37 by the intermediate mass to the ground alignment struts 53. The intermediate mass to the ground springs 27, the four retainers 40 and four locking nuts 41. The payload 13 is movably connected to the intermediate mass 11 by the payload mass to the intermediate mass struts 55, the payload mass to the intermediate mass springs 26, the two retainers 41 and the two locking nuts 40. One end of the payload mass to intermediate mass springs 26 rests on the stops 30 that are rigidly connected to the payload mass to the intermediate mass struts 55. The payload 13 is also movably connected to the rigid structure 37 by the payload mass to the ground alignment struts 39, the payload mass to the ground springs 24, the four retainers 40 and the four locking nuts 41.

Figure 2:
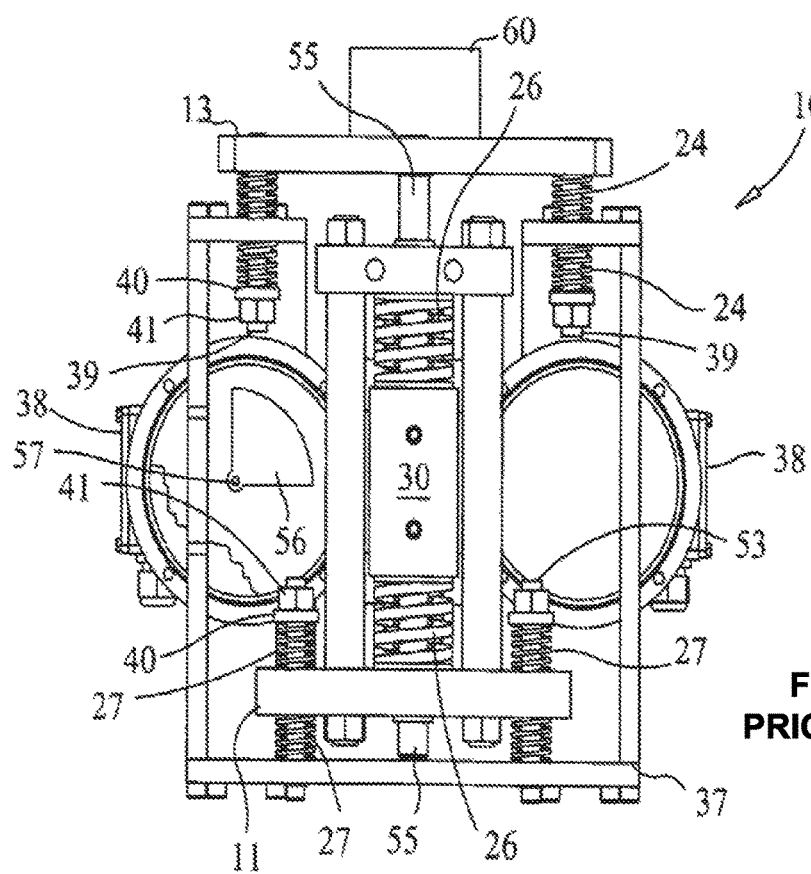
FIG. 2 is a right side sectional view of the flat plate resonant mixer of FIG. 1.

FIG. 2 is a right side view of the resonant mixer 10. The intermediate mass 11 supports the payload mass 13 and the oscillator mass 12 in parallel. Furthermore, the oscillator mass 12 is not directly connected to the payload mass 13. In FIG. 2, a portion of the cover of one of the servo motors 38 is not shown so that one of the motor shafts 57 and one of the eccentric masses 56 are visible.

In another implementation, the resonant mixer 10 further includes a mixing chamber 60. The mixing chamber 60 is attached to either the intermediate mass 11 or the payload 13. The mass that does not have the mixing chamber 60 attached to it may also be divided into multiple masses, each with its own resilient member attachment to attach the mass to the mass that does not have the mixing chamber 60 attached to it.

Figure 3:
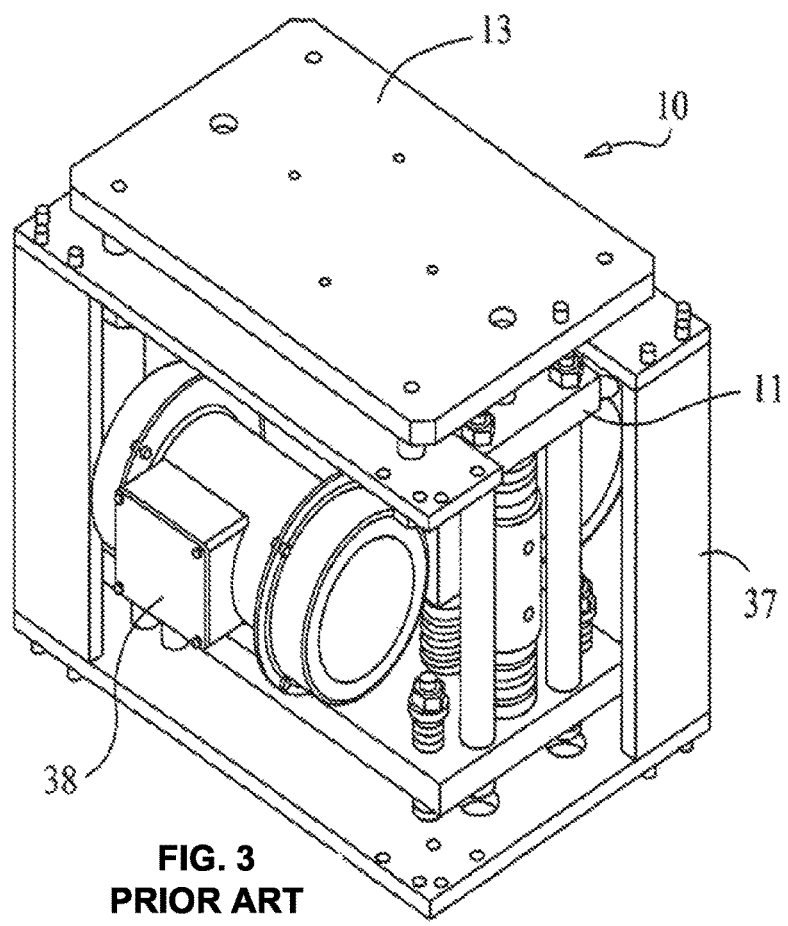
FIG. 3 is a perspective view of the flat plate resonant mixer of FIGS. 1 and 2.
Figure 4:
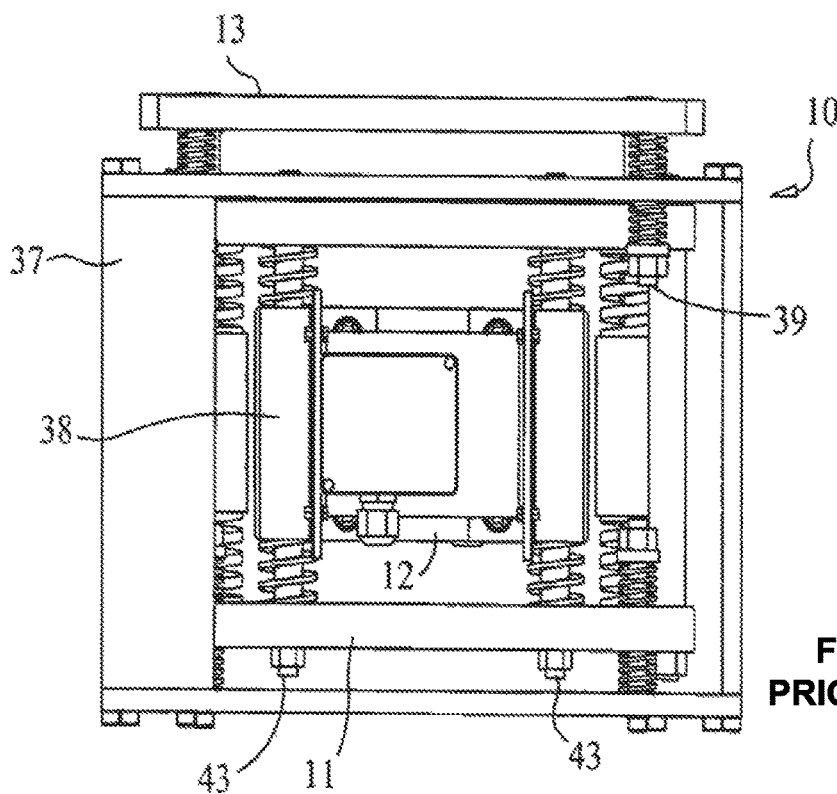
FIG. 4 is a front elevation view of the flat plate resonant mixer of FIGS. 1-4.

Referring to FIGS. 3 and 4, another implementation of the resonant mixer 10 is illustrated with elements deleted from the corner of resonant mixer 10 that is nearest the viewer in FIG. 3. In these views, both of the oscillator drives 38 are visible.

In yet another implementation, additional servo motors 38 can be added to the resonant mixer 10 to provide for variability of the impulse force while the resonant mixer 10 is in operation. With the addition of two more servo motors 38 with the identical eccentric masses 56, total force cancellation can be achieved. This is accomplished by setting all the motor axes to be parallel to one another with two motors rotating clockwise and two motors rotating counterclockwise. The eccentric masses 56 are selected so as to cancel out all forces at startup by setting the phase angle to 180 degrees for counter rotating pairs of motors. When the motors have reached the desired frequency of rotation, the eccentric masses 56 are moved out of phase, thus creating an impulse force. The phase angle movement is accomplished by decelerating two of the motors for a fraction of a revolution and then reestablishing the selected frequency of rotation such that the eccentric masses no longer oppose each other. Deceleration of the motors is accomplished through a servo motor motion control unit.

Operation of the various implementations of the resonant mixer 10, as illustrated in FIGS. 1-4, is achieved by the synchronized rotation by the servomotors 8 of the eccentric weights 56 of equal mass and inertial properties that are attached to each end of the shafts 57 of the servomotors 38. Synchronization of rotation of the two shafts 57 is accomplished by electronic controls. The rotating shafts 57 of the two servomotors 38 are oriented parallel to each other and are operated in opposing rotational directions with their eccentric weights 56 opposing each other at the horizontal axis and coincident in the vertical axis. This arraignment produces vertical linear forces with horizontal force cancellation.

The centerline axis of each of the shafts 57 and the centroid of the attached eccentric masses 56 form a mass plane. In the course of one revolution, the initial position has the mass planes parallel to one another with the eccentrics 56 on each shaft above a motor plane defined by the two parallel motor shafts 57. At a quarter turn, the mass planes are coincident with the motor plane and the eccentric weights 56 of each of the shafts 57 are nearest each other. The centrifugal forces created by the eccentric masses 56 are translated in the motor plane. This force is of the same magnitude but opposite direction for each of the shafts 57. This effectively cancels the force in the plane of the motor. At one half a revolution, the mass planes are again perpendicular to the motor plane and the eccentrics 56 are all below the motor plane. The centrifugal force acting on each of the shafts 57 is in the same direction, perpendicular to the motor plane. At three quarters of a revolution, the mass planes and the motor plane are again coincident but the eccentric masses 56 of each of the shafts 57 are oriented away from each other. Here again, the centrifugal forces created by the eccentric masses 56 are translated in the motor plane. This force is of the same magnitude but opposite direction for each of the shafts 57. This effectively cancels the force in the plane of the motor. At one full revolution, the mass planes are again perpendicular to the motor plane and the eccentrics 56 are all above the motor plane. The centrifugal force acting on each of the shafts is in the same direction, perpendicular to the motor plane. The force acting perpendicular to the motor plane is translated vertically through connecting springs to intermediate mass 11. A further translation is then achieved through linear guides and springs from intermediate mass 11 to payload mass 13. The springs that comprise the spring beds 24, 25, 26 and 27 are selected to optimize force transmission through the intermediate mass 11 to the payload mass 13 and minimize transmission to the supporting structure 37 and surrounding environment.

Operation at resonance is determined when the disparity between the payload mass level of vibration and the driver mass level of vibration is maximized. This resonant condition is dependent on the selected spring/mass system. The springs characteristics and mass weights are chosen such that the resonant condition is achievable for the anticipated payload weight.

Operation at the resonant condition is not always required to achieve the level of mixing desired. Operation near resonance provides substantial amplitude and accelerations to produce significant mixing. The desired levels of mixing are set by satisfying time requirements with dispersion requirements. To mix faster or more vigorously, amplitude is increased by operating closer to resonance. Operation is typically within 10 Hz of resonance. As the frequency approaches the resonant condition, small changes produce large results.

The mixing vessel 60 is attached to payload mass 3. Vigorous mixing is achieved when the transmitted force is converted to acceleration and displacement amplitude thrusting the mix constituents up and down producing a toroidal flow with sub-eddy currents.

In a further implementation, two more servo motors 38 are added to the resonant mixer 10 shown in FIGS. 1-4. The two additional servo motors 38 are fitted with eccentric weights 56 having the same physical characteristics as those above noted. The additional motors 38 may control the impulse force. This may be accomplished by controlling the relative phase angle between the two sets of motors 38. In a similar manner as described above, the two sets of servo motors 38 are electrically controlled to accomplish total force cancellation through all frequencies. After the desired frequency has been achieved, the relative phase angle between the two motor sets is changed until the desired impulse force has been achieved. This arraignment has the added advantage of producing variable force and frequency.

In another implementation of the resonant mixer 10, the variable resilient members are substituted for the springs 24, 25, 26 and/or 27 to provide for changes to the resonant frequency. This addition also allows for a larger variability in the payload without sacrificing performance. The variable resilient members can be either mechanically or electronically controlled. Examples of such devices are air filled bellows, variable length leaf springs, coil spring wedges, piezoelectric bi-metal springs, or any other member which can be used as a resilient member which also has the capability of having its spring rate changed or otherwise affected.

Rather than mix by inducing bulk fluid flow, as is the case for impeller agitation, the resonant mixer mixes by inducing micro-scale turbulence through the propagation of acoustic waves throughout the medium. It is different from ultrasonic agitation because the frequency of acoustic energy is lower and the scale of mixing is larger. Another distinct difference from ultrasonic technology is that the resonant mixer devices, configured as show in FIGS. 1-4, are simple, mechanically driven agitators that can be made large enough to perform industrial scale tasks.

A difference between the acoustic agitation technology disclosed herein and conventional impeller agitation is the scale at which complete mixing occurs. In impeller agitation, the mixing occurs through the creation of large scale eddies which are reduced to smaller scale eddies where the energy is dissipated through viscous forces. With acoustic agitation, the mixing occurs through acoustic streaming, which is the time-independent flow of fluid induced by a sound field. It is caused by conservation of momentum dissipated by the absorption and propagation of sound in the fluid. The acoustic streaming transports "micro scale" eddies through the fluid, estimated to be on the order of 100-200 um. Although the eddies are of a microscale, the entire reactor is well mixed in an extremely short time because the acoustic streaming causes the microscale vortices to be transmitted uniformly throughout the fluid.

Figure 5:
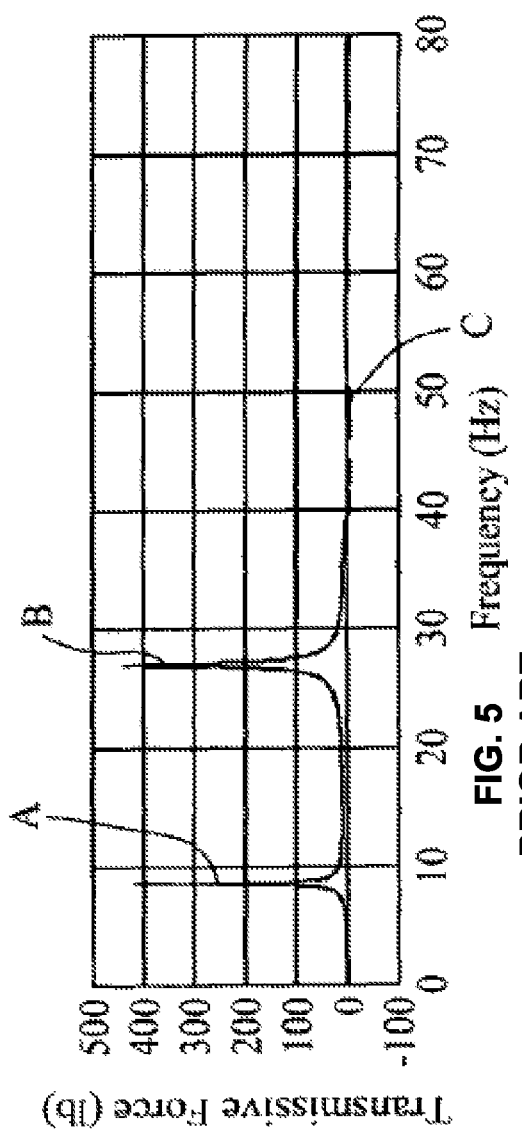
FIG. 5 is a diagram representing the transmissive force response behavior of the flat plate resonant mixer of FIGS. 1-4.

The resonant mixer 10 in FIGS. 1-4 may be operated at resonance to produce intense displacement and acceleration so as to provide vigorous mixing potential. FIG. 5 shows an aspect of the response of resonant mixer 10 presented in FIGS. 1-4 to operation at various oscillator frequencies. The graph shows the force transmitted to the ground by the resonant mixer 10 when operated at each indicated frequency. Operation at the first harmonic frequency of the resonant mixer 10, illustrated as point A, and at the second harmonic frequency of resonant mixer 10, illustrated as point B, are indicated by the force peaks shown on the graph. In operation, a user selects an operating frequency at or near the third mode (i.e., at or near the third harmonic frequency of resonant mixer 10 or point C) as appropriate for the desired level of mixing.

Figure 6:
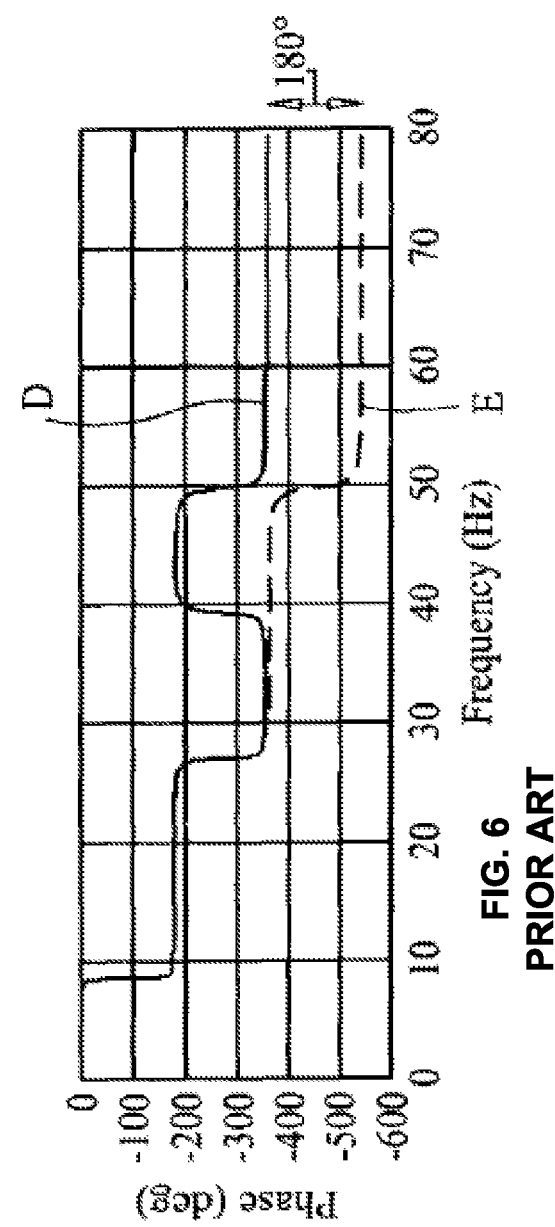
FIG. 6 is a diagram representing the phase response behavior of the flat plate resonant mixer of FIGS. 1 4.

FIG. 6 shows another aspect of the response of the resonant mixer 10, illustrated in FIGS. 1-4, to operation at various oscillator frequencies. Specifically, FIG. 6 shows the phase of motion of the payload mass 13 and the reaction mass (e.g., the intermediate mass 11). Above a frequency of about 40 Hz, the phase difference between the payload mass 13 and the reaction mass is about 180 degrees, indicating that they are moving in opposite directions.

Figure 7:
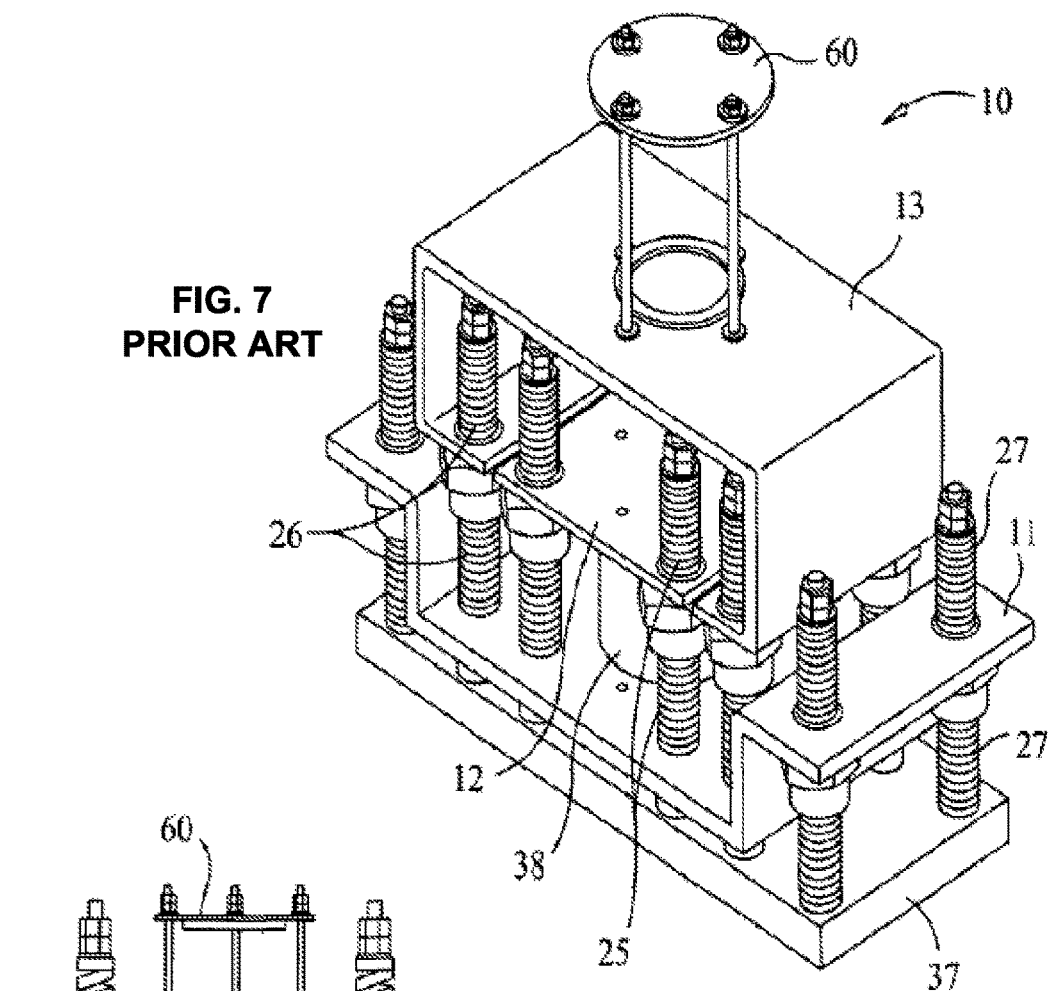
FIG. 7 is a perspective view of an alternative flat plate resonant mixer.

FIG. 7 shows another example of a three-mass system with a low-mounted vibration drive. In the low-mounted vibration drive system, the oscillator mass 12 and the payload mass 13 are situated at approximately the same elevation and both are above the intermediate mass 11. This illustrates that the relative locations of the masses can vary among implementations.

Figure 8:
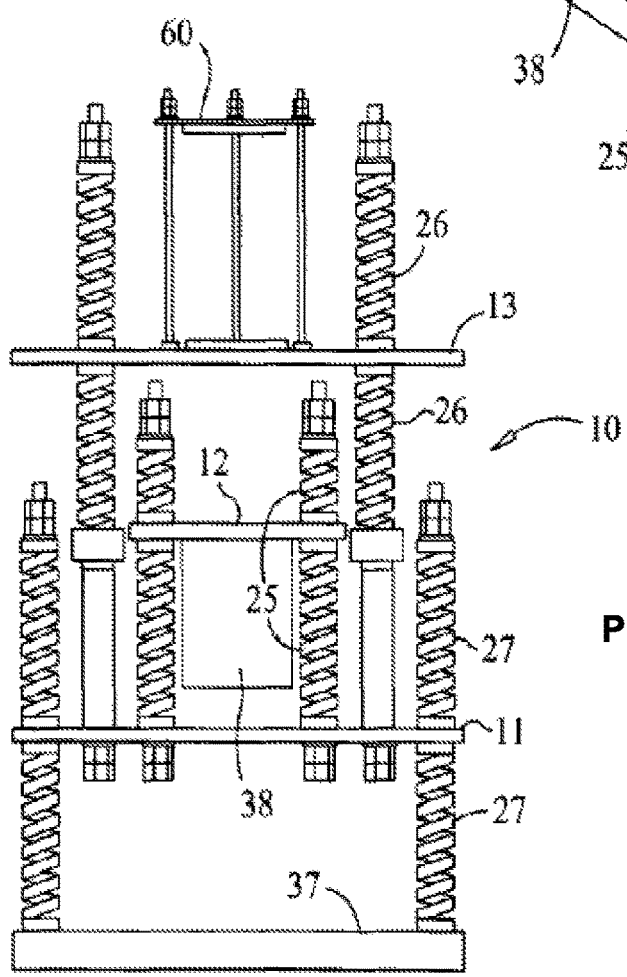
FIG. 8 is a side or front view of another alternative flat plate resonant mixer.

FIG. 8 shows another example of three-mass system with a middle-mounted vibration drive. In the middle-mounted vibration drive system, a single linear electromagnetic force transducer 38 is rigidly attached to the middle of the oscillator mass 12. The oscillator mass 12 is movably connected to the intermediate mass 11 by the intermediate mass springs 25. The payload mass 13 is movably connected to the intermediate mass 11 by the springs 26. The intermediate mass 11 is movably connected to base 37 by the ground springs 27.

Figure 9A:
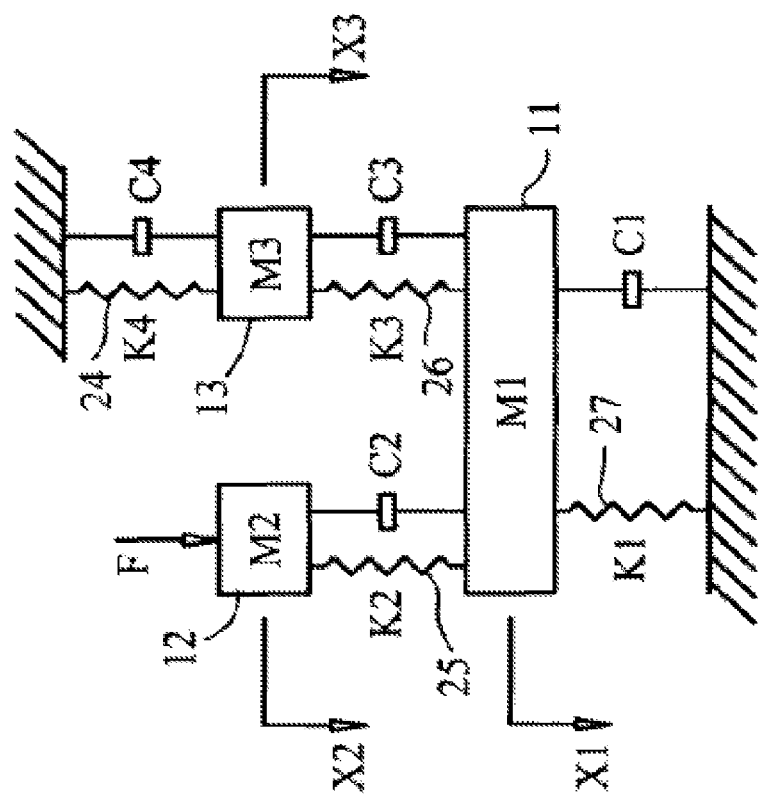
FIG. 9A is a schematic free body diagram of the flat plate resonant mixer of FIG. 1.

Referring to FIG. 9A, a free body diagram of one implementation of the resonant mixer 10, illustrated in FIGS. 1-4, is presented. The following are the equations of motion of resonant mixer 10

$$m_1 a_1 = -k_1 x_1 - c_1 v_1 + k_2(x_2 - x_1) + k_3(x_3 - x_1) + c_2(v_2 - v_1) + c_3(v_3 - v_1)$$

$$m_2 a_2 = -k_2(x_2 - x_1) - c_2(v_2 - v_1) + F$$

$$m_3 a_3 = -k_3(x_3 - x_1) - c_3(v_3 - v_1) - k_4 x_3 - c_4 v_3$$

where:
$m_x$=mass x
$m_1$=payload mass
$m_2$=intermediate mass
$m_3$=oscillator mass
$k_x$=spring rate of spring x
$c_x$=damping coefficient of dash pot x
$x_x$=position of mass x
$v_x$=velocity of mass x
$a_x$=acceleration of mass x
F=applied force by solving these equations simultaneously, appropriate weights for the masses and appropriate spring rates and damping coefficients for the springs can be selected for implementations of the invention. A person having ordinary skill in the art would be capable of writing similar equations for other embodiments of the invention.

There are an infinite number of solutions to the three equations of motion above which describe the motion of the three mass system of resonant mixer 10. Optimization of the system is dependent upon the desired operation of the system. In general, the selection of mass and spring sizes are subject to increasing payload amplitude, reducing forces transmitted to ground and decreasing driver amplitude. One implementation uses spring ratios as follows; k1/k1=1, k2/k1=4.6, k3/k1=3.9, k4/k1=1.3, and mass ratios of; m1/m1=1, m2/m1=1.17, m3/m1=0.6. The dashpot constants are a result of natural damping in the implementation and are not actual components. Therefore, the values of dashpot constants may be determined by testing after an embodiment is fabricated.

Control of a three mass system includes two primary aspects. The first aspect includes control of the phase angle or relative position of each of the servo motors with respect to each other. The sensors for this are the resolvers which are attached to the shaft of each motor. These devices send an absolute position signal back to the motion controller which tracks the position error from one motor to another. In turn, the motion controller then calculates and sends a correction signal back to the motors. This keeps the motors phase angles within a tolerance which is set in the control code.

The second aspect of the control system is the setting and maintenance of a desired vibration amplitude. This is accomplished by monitoring the amplitude of the payload mass movements (m1) with an accelerometer. The signals from the accelerometer are sent to the motion controller and are compared to a value set by the operator. An error correction signal is then calculated and sent to the motors to increase or decrease their frequency and phase angle to achieve the desired amplitude.

Control of the phase angle of the motors also has two aspects. The first aspect is to maintain motor-to-motor position and the second aspect is to control the magnitude of the force input to the system. Maintenance of motor-to-motor position is necessary so that the resultant force input to the system is oriented in a single direction. This is accomplished by controlling the position of motor pairs. The motors are paired in twos or sets such that each set has identical phase angles. The motor pairs are then set in motion such that they have equal but opposite rotational frequencies. The phase position is then controlled in a manner that sums the resultant forces from the eccentric masses in a singular direction which is parallel to the orientation of the spring axes. Force magnitude is controlled by the controlling the phase angle between motor pairs. If the motor pairs are 180 degrees out of phase with each other, the net resultant force is zero. When the phase angle between motor pairs is zero degrees, the net resultant force is 100 percent of the summation of the four eccentric masses. Phase angles between these extremes result in forces that are lower than the maximum.

Figure 9B:
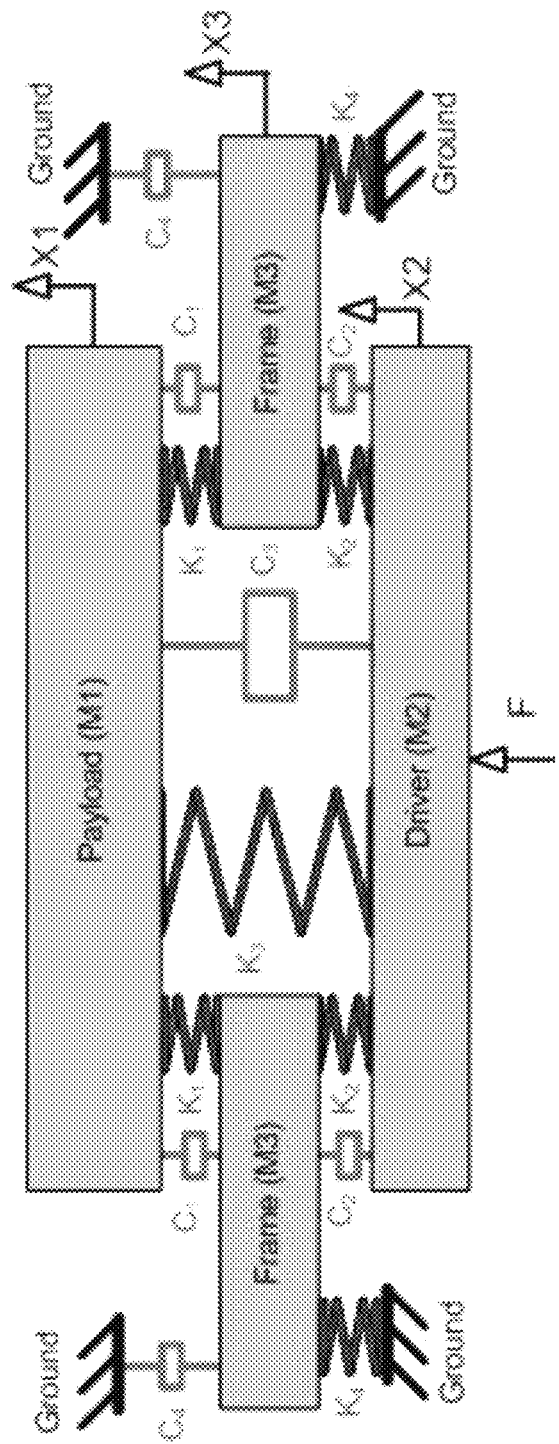
FIG. 9B is a schematic free body diagram of another example of a flat plate resonant mixer.

FIG. 9B shows a free body diagram of another example implementation of a resonant acoustic mixer. The mixing system in FIG. 9B functions in a similar fashion as the mixing system show in FIG. 9A, but the configuration is different. FIG. 9B shows a mixing system with a single mass coupled to the ground through a single set of springs. Whereas FIG. 9A includes two masses and two sets of springs coupled to ground.

The following are the equations of motion of the vibratory mixing system shown in FIG. 9B:

$$m_1 a_1 + k_3(x_1-x_2) + k_1(x_1-x_3) + c_3(v_1-v_2) + c_1(v_1-v_3) = 0$$

$$m_2 a_2 + k_3(x_2-x_1) + k_2(x_2-x_3) + c_3(v_2-v_1) + c_2(v_2-v_3) = F$$

$$m_3 a_3 + k_1(x_3-x_1) + k_2(x_3-x_2) + k_4 x_3 + c_1(v_3-v_1) + c_2(v_3-v_2) + c_4 v_3 = 0$$

In addition to being used for mixing substances, the resonant acoustic mixers described above can be configured for spray coating various substances as described below. In some implementations, a resonant acoustic mixer can be a vibratory mixer. FIG. 10A-33 show schematic views of various examples of vibratory mixer based spray coating systems $100a$-$100w$ (generally coating systems 100). Each coating system 100 includes a payload plate 102, a mixing vessel 104, and a sprayer 106. Such coating systems can mix, coat, dry, combine, and/or segregate materials with low frequency, high intensity acoustic energy to fluidize the materials being processed. The coating systems 100 can be equipped with one or more optional components, such as temperature sensors, vacuum sources, pressure pumps, heating and cooling jackets, filters, temperature and mixedness sensors, and sieves to improve the mixers' ability to mix, coat, dry, combine, or segregate materials in various applications.

In general, the mixing systems 100 add small droplets (from nano to rain drop sized (~6 mm)) of liquids or powders to a material that is being agitated using an acoustic mixer similar to the mixers described above. Additional description of such mixers can be found in U.S. Pat. Nos. 7,188,993 and 7,866,878, the entirety of which are incorporated herein by reference.

Figure 10A:
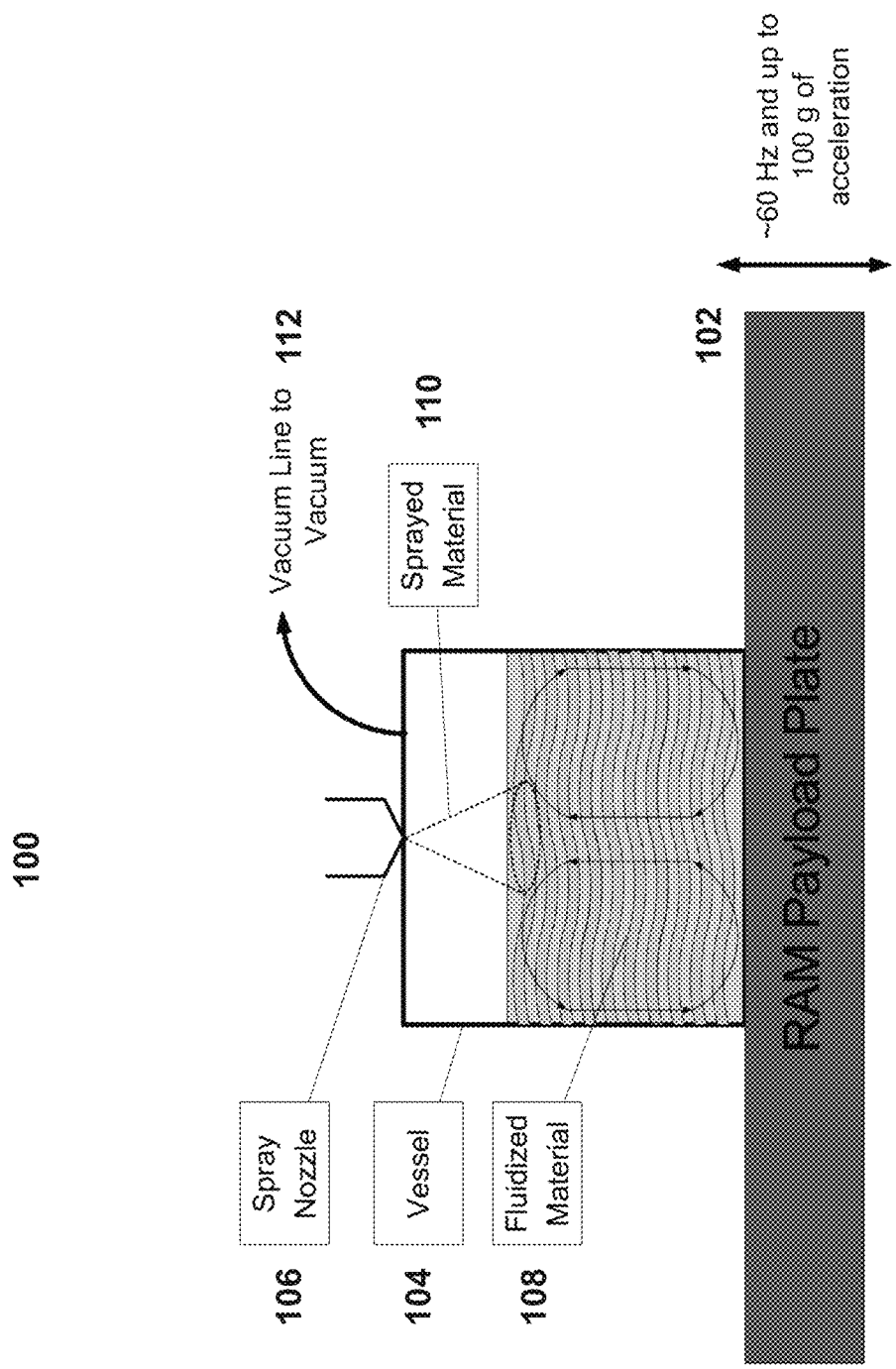
FIGS. 10A-17 are illustrative examples of various implementations of a vibratory mixing system.

FIG. 10A shows an example of coating system $100a$. The coating systems 100 includes an acoustic mixer payload plate 102, a mixing vessel 104, a sprayer 106, and a vacuum line 112. The coating systems 100 is configured to fluidize solid materials without the use of gaseous media by moving the mixing vessel 104 with displacement amplitudes between 0.02 inch to about 0.5 inch. The mixing vessel 104 may be moved while positioned on top of the payload plate 102. The payload plate 102 is capable of oscillating at operating frequencies between about 15 Hz to about 1,000 Hz. For spray applications, the payload plate 102 is configured to frequencies of about 50 Hz to about 70 Hz. For some spray applications, in some implementations, the payload plate 102 may oscillate up to an operating frequency of about 180 Hz. In one implementation, the payload plate 102 may oscillate at an operating frequency of about 60 Hz.

During operation, the coating systems 100 may cause a material to be coated to become a fluidized bed due to the high acoustic energy produced from the payload plate 102 oscillating under the mixing vessel 104. In one implementation, the coating systems 100 forms a fluidized bed of solid materials when the mixing vessel 104 is under pressure, atmospheric pressure, or under partial or full vacuum. When a full vacuum is applied, the fluidized bed may be formed by particle-to-particle interaction. In some implementations, the primary mixing mechanism may be from collisions that are driven by inter-particle redistribution. Collision-related mixing processes may increase with higher accelerations. In some implementations, the mixing is done without acoustic interaction because there is no media gasses to carry an acoustic wave. As discussed further below, the coating systems 100 has been demonstrated to form a fluidized bed on hard to fluidize materials, where typical gaseous fluidizers rat hole or create plug flow.

The mixing vessel 104 may contain the material to be coated. The mixing vessel 104 may be any type of container used for mixing, combining, segregating, coating or drying materials. Additionally, the mixing vessel 104 may be of any size that can fit within the acoustic mixer. In one implementation, the mixing vessel 104 may be a small micro well plate. In another implementation, the mixing vessel 104 may be configured to hold up to 500 gallons of materials. In other implementations, the mixing vessel 104 has an intermediate size. In one implementation, the mixing vessel 104 may be filled no more than 90% of the maximum volume during operation. The material may be a powder, a liquid or combination of a powder and a liquid material.

Figure 10B:
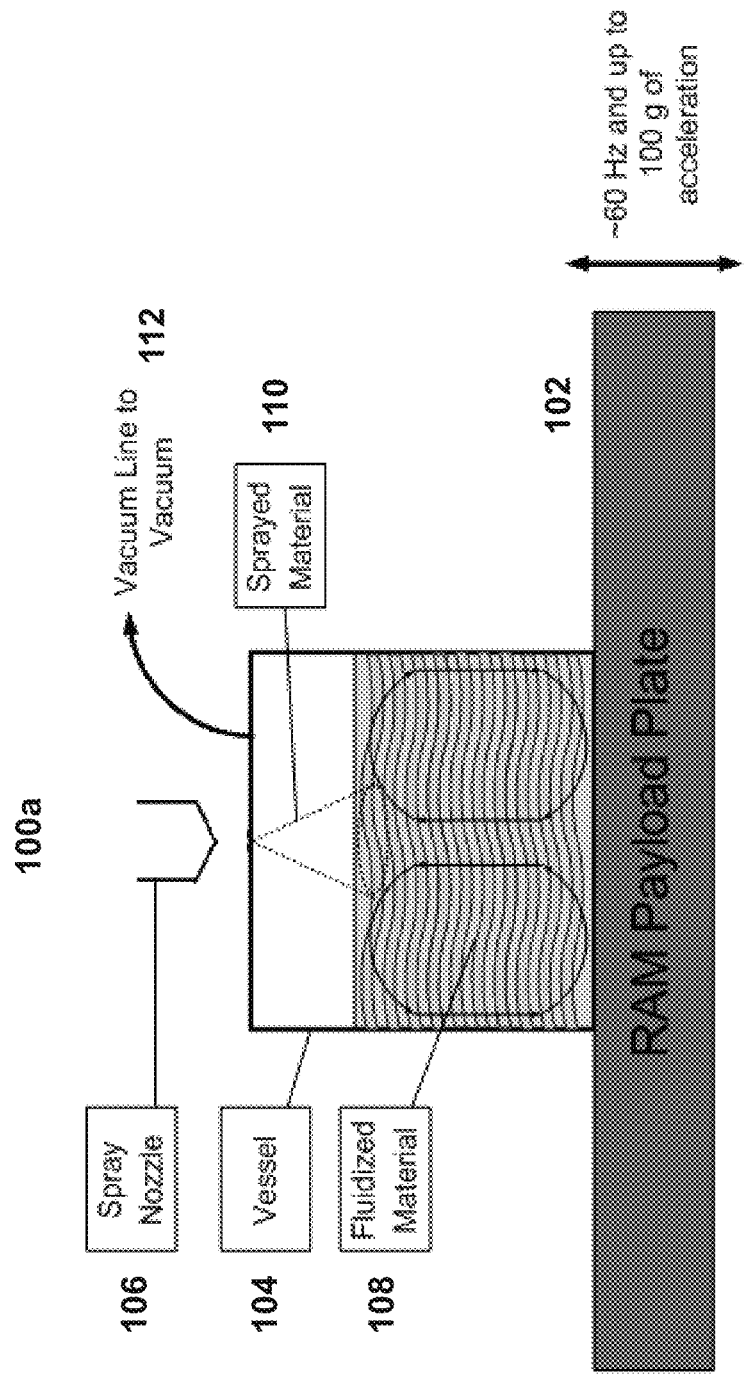

The sprayer 106 is configured to direct a coating material 110 onto a uniformly fluidized bed, as illustrated in FIG. 10A. The sprayer 106 may introduce the coating material 110 into the mixing vessel 104. The sprayer 1006 may be any device for emitting materials in liquid or solid form. In one implementation, the sprayer 106 may be an atomizer. The sprayer 106 may be positioned along a top portion of the mixing vessel 104. In some implementations, the sprayer 106 may be positioned adjacent to a side of the mixing vessel 104 (see FIG. 27). In still another implementation, the sprayer 106 may be coupled to the bottom of the mixing vessel 104 (see FIG. 19). FIG. 10B shows another example coatings systems $100a$, wherein the sprayer 106 is not directly coupled to the mixing vessel 104 and still introduces the coating material 110 into the mixing vessel 104.

Many different types of sprayers 106 may be used in conjunction with the coating systems 100. The particle sizes of the coating material 110 released from the sprayer 106 can be from nano-sized to rain drop sized. Industry standard atomizers or sprayers, including pressure atomizers (e.g., plain orifice, pressure-swirl, square spray, duplex, spill return, and fan spray), rotary, air-assist, airblast, electrostatic, ultrasonic, sonic, windmill, vibrating capillary, flashing liquid jet, effervescent, and/or piezoelectric atomizers may be coupled with the coating systems 100. The type of nozzle as well as the fluid parameters of density, viscosity, and surface tension play a large role in the size of fluid particles being sprayed from the nozzles and can be varied depending on the particular coating application undertaken.

As shown in FIG. 10A, in some implementations, the vacuum line 112 may be coupled to the mixing vessel 104 and introduce a vacuum source to the mixing vessel 104. The vacuum source may effect the pressure in the mixing vessel 104. The vacuum source can create partial or full vacuum in the mixing vessel 104 dependent upon the type of materials involved and the desired application.

Figure 11:
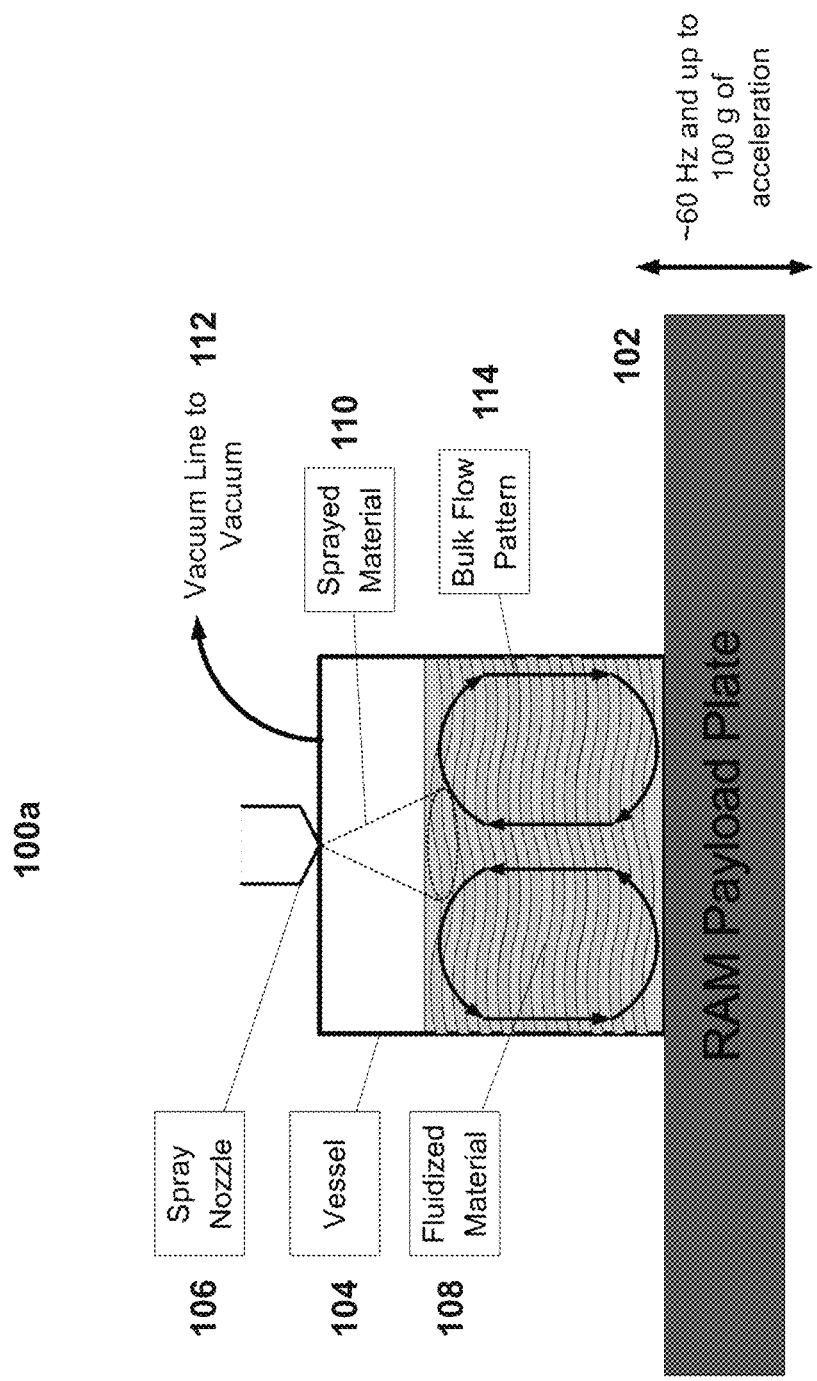
Figure 12:
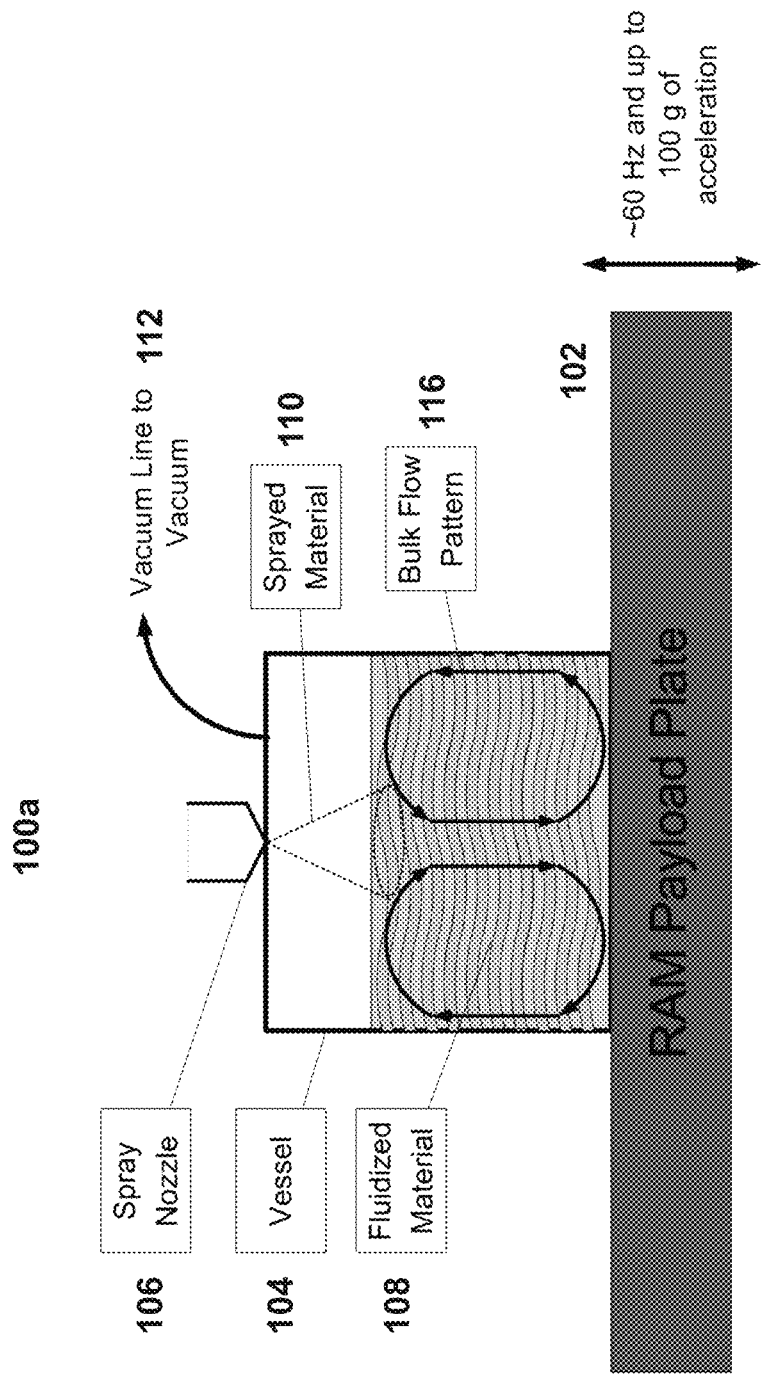
Figure 13:
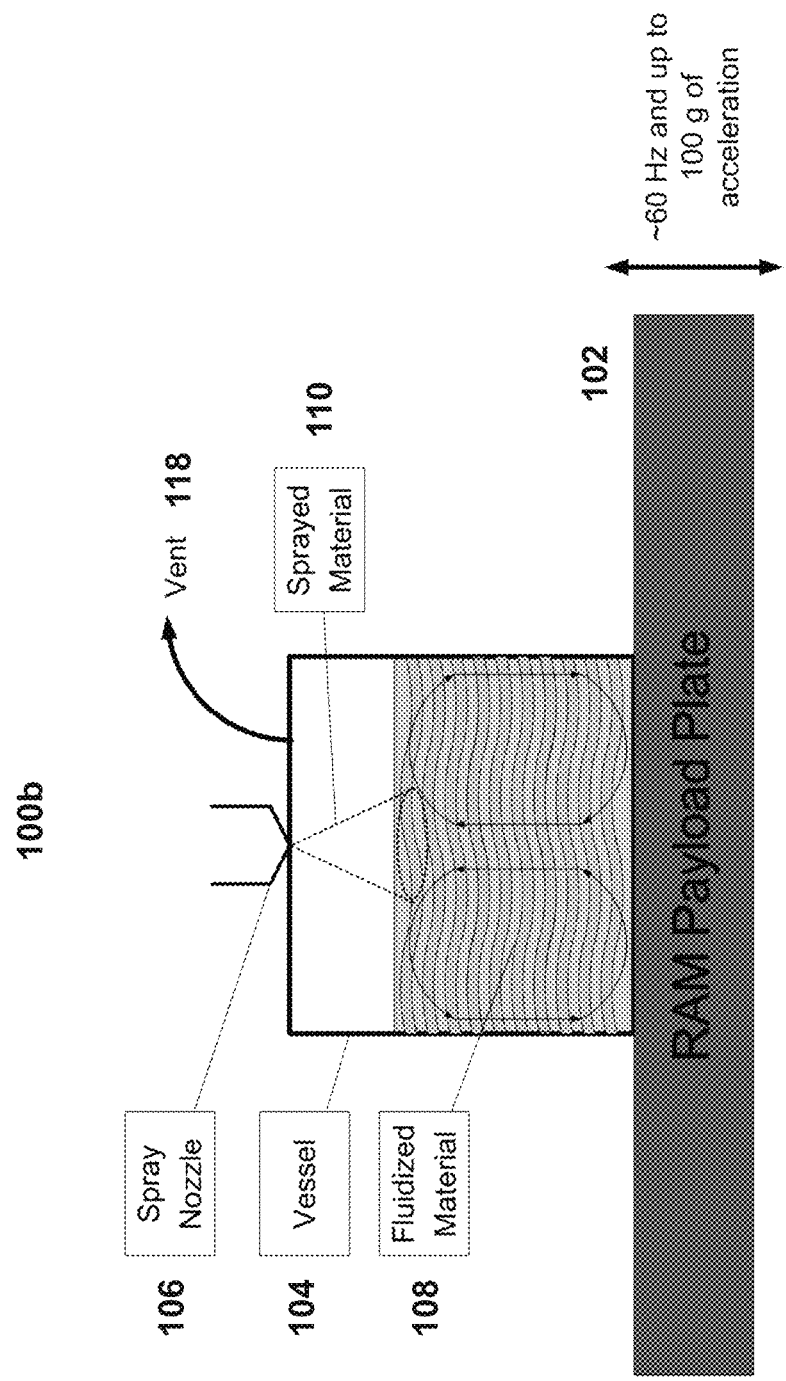
Figure 14:
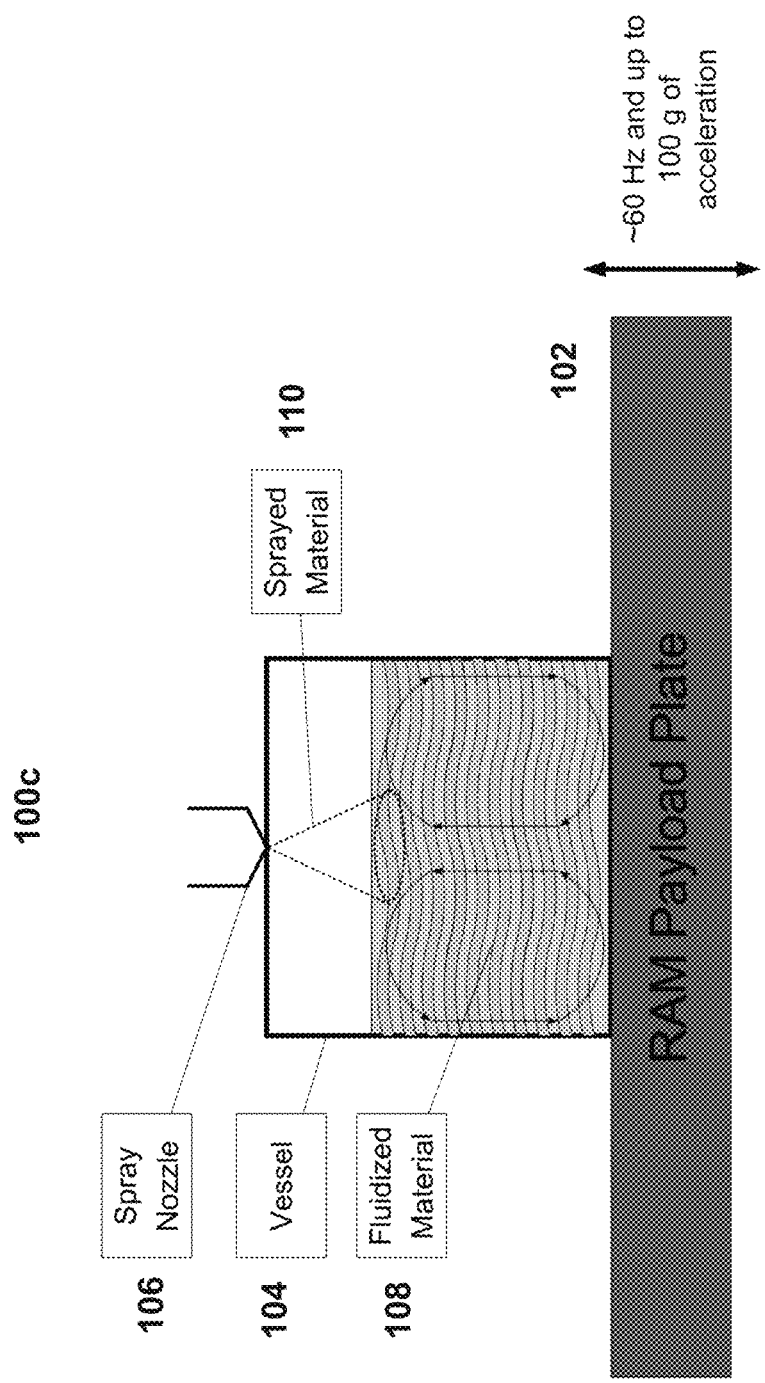
Figure 15:
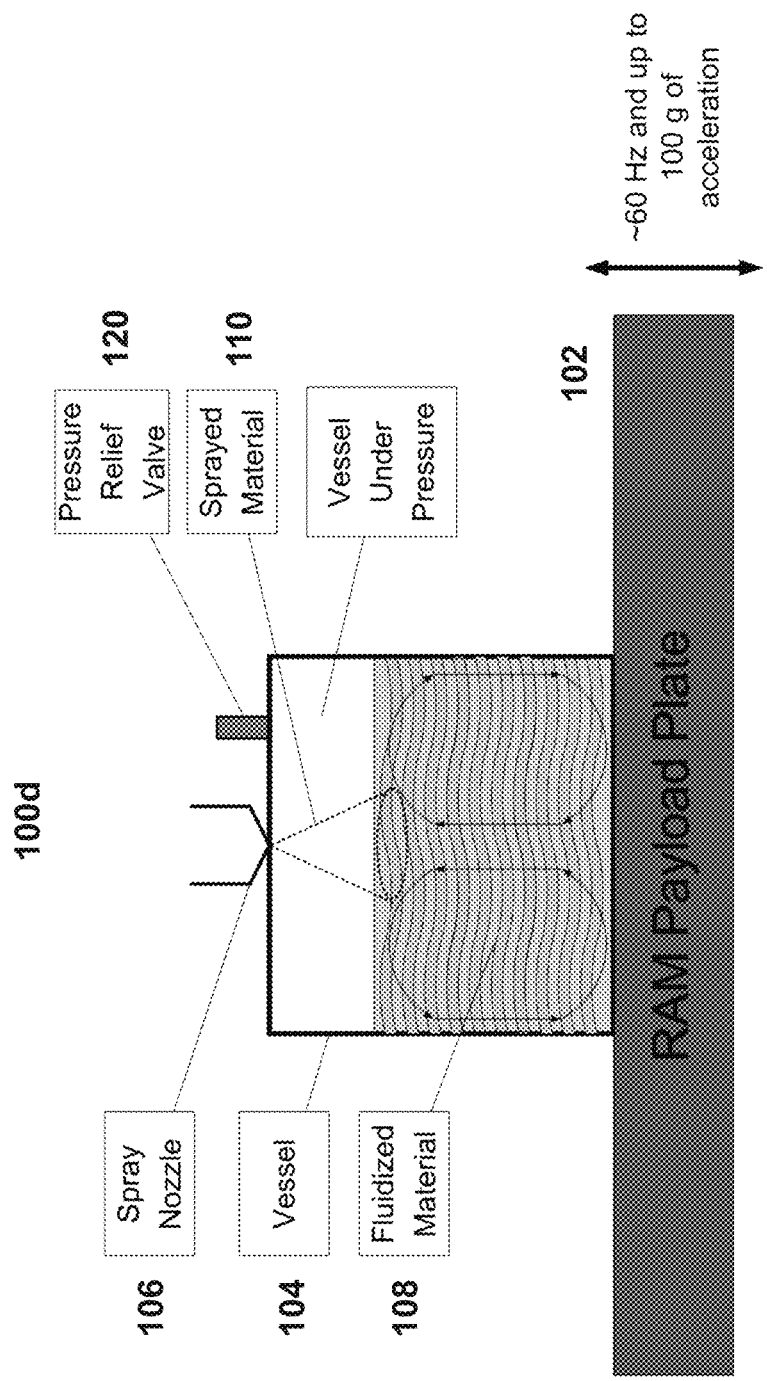
Figure 16:
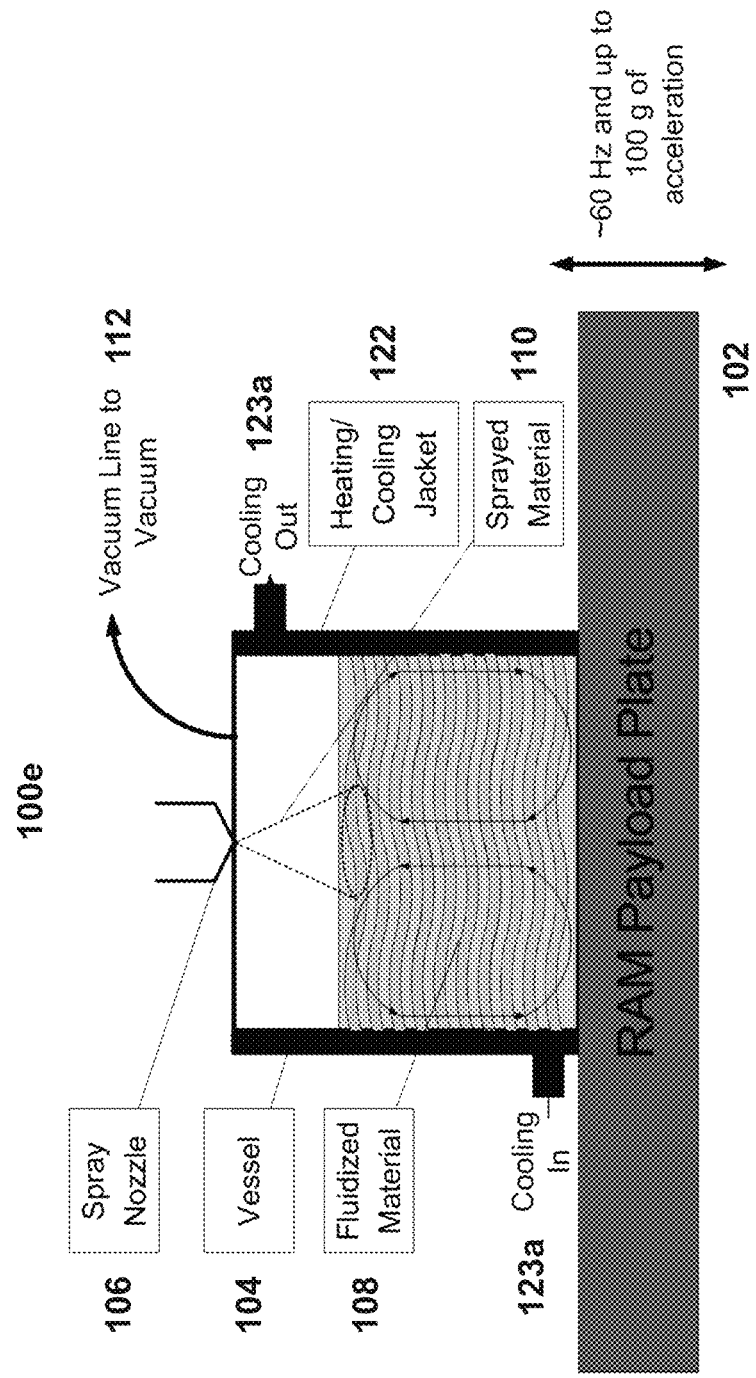
Figure 17:
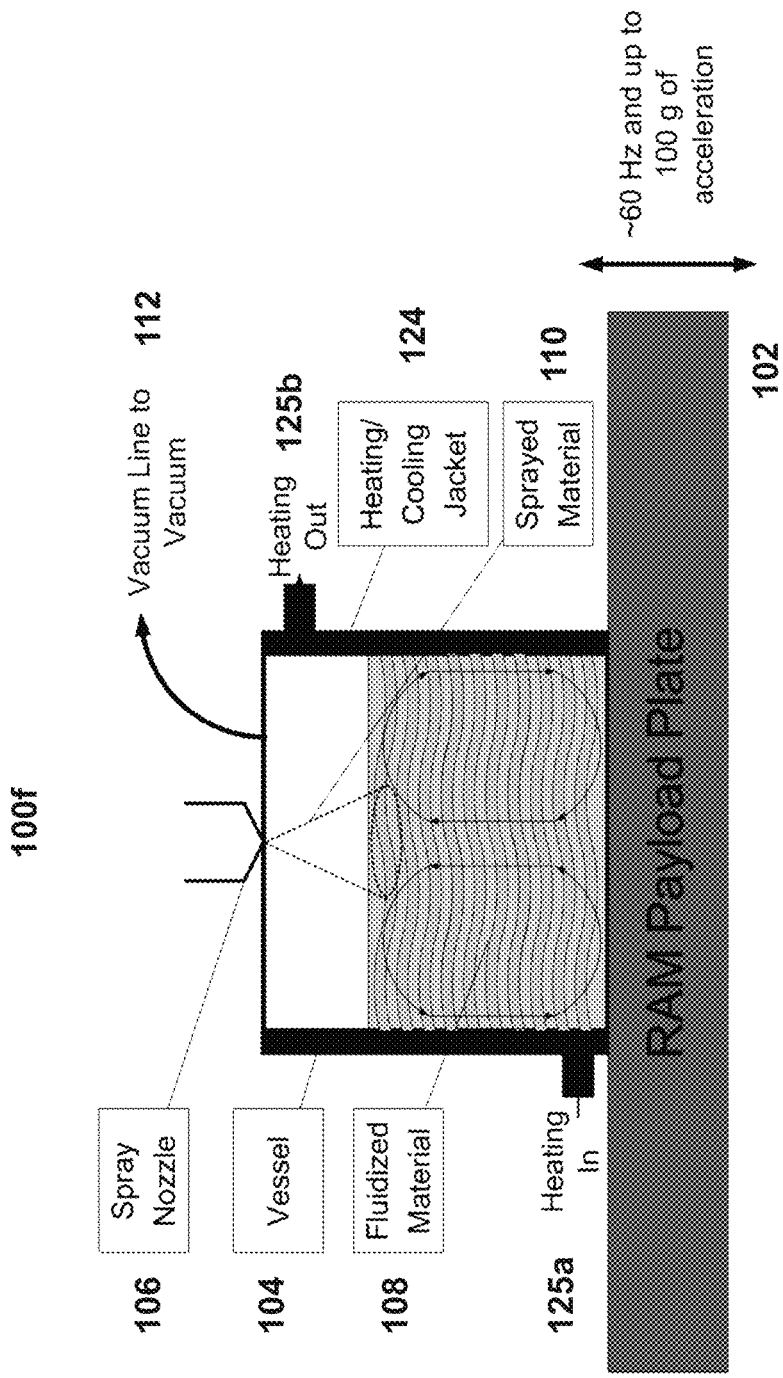
Figure 18:
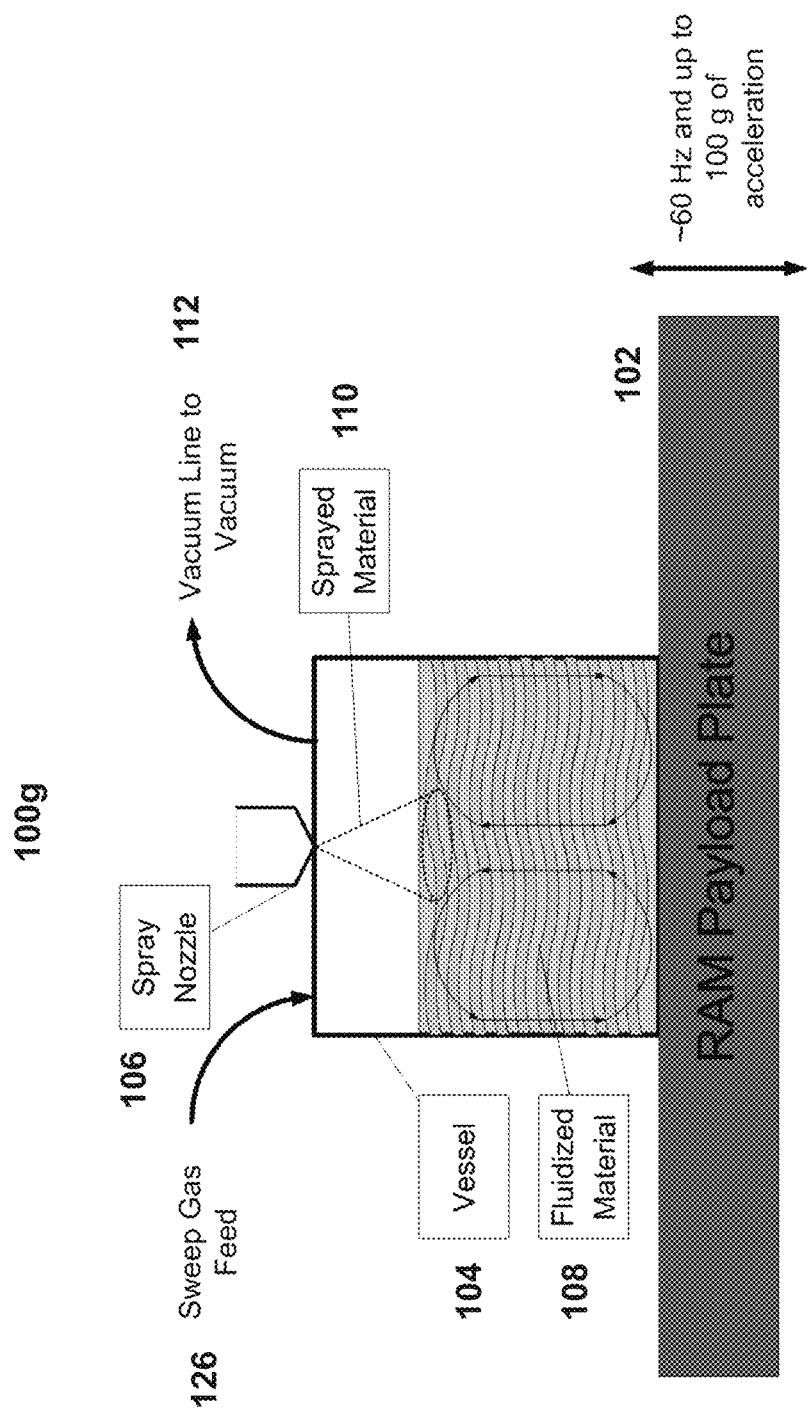
FIGS. 18-20 are illustrative examples of a vibratory mixing system used for drying.
Figure 19:
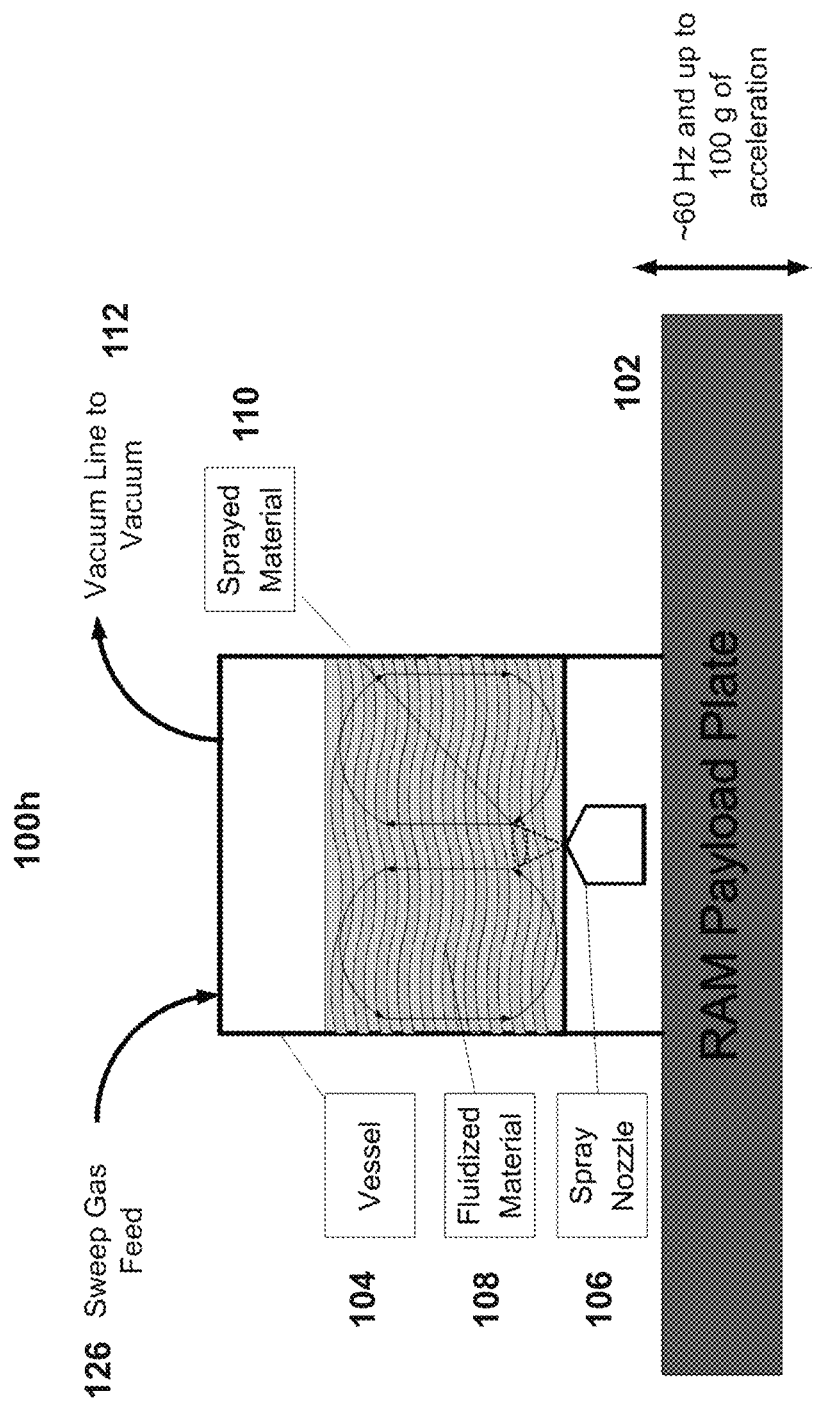
Figure 20:
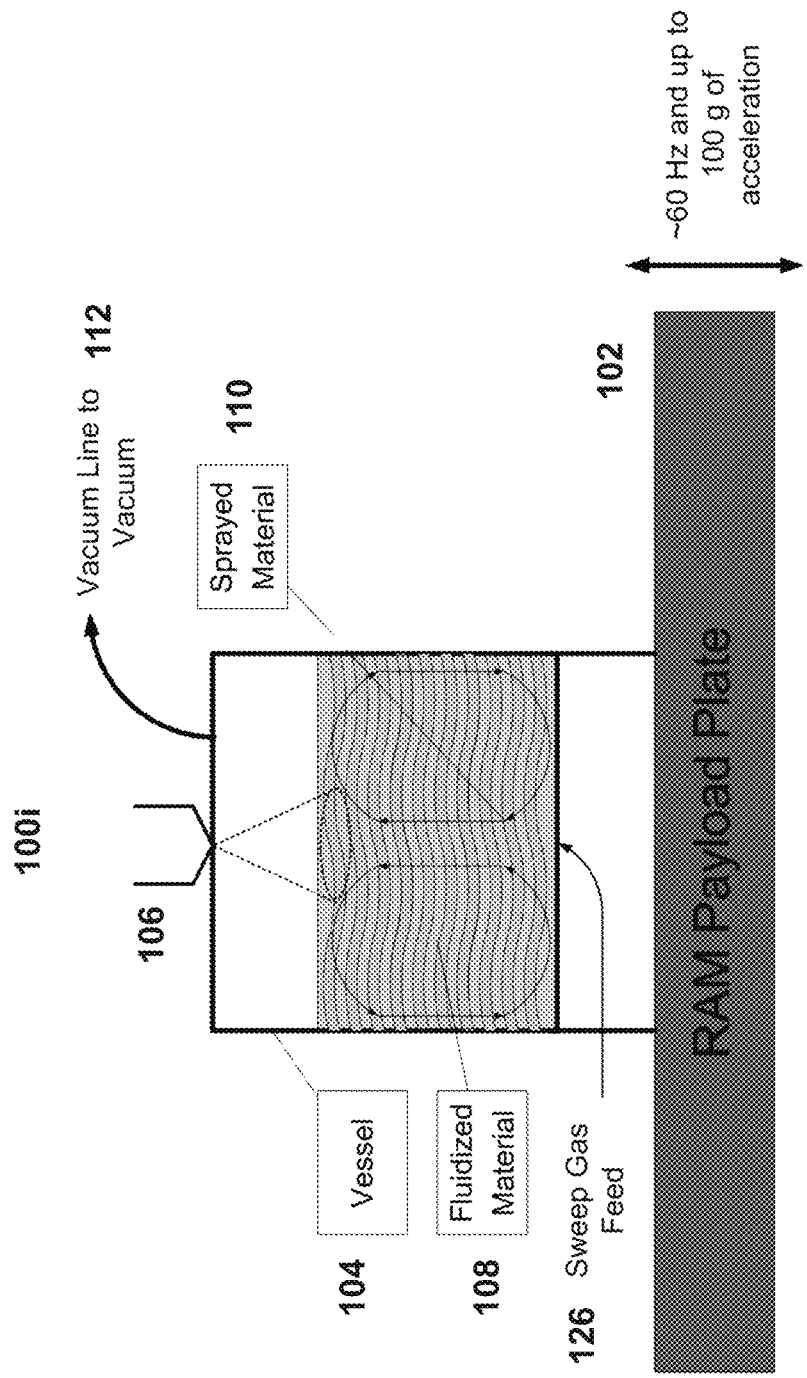

The fluidized bed created by the coating systems 100 may have more consistent material turnover as compared to gas driven fluidized beds because of uniform bulk mixing. The bulk mixing provides top to bottom circulation of the materials in the mixing vessel or reactor. FIGS. 11 and 12 display illustrative examples of two traditional bulk mixing flow patterns. In FIG. 11, the bulk flow pattern travels up the center of the mixing vessel 104 and down the sides. In FIG. 12, the bulk flow pattern travels up the sides of the mixing vessel 104 and down the center. Different flow patters' may be caused by material interactions within the mixing vessel 104. The material interactions may be caused by the shape of the mixing vessel 104, including the shape of the walls, top and bottom of the mixing vessel 104. In some implementations, a third material may be introduced inside the mixing vessel 104 to create a different bulk flow pattern. The third material may be a baffle or any type of material to change, direct or affect the flow of the material mixing inside the mixing vessel 104.

The acoustic mixer can cause both micro-mixing of the particles as well as bulk mixing of the particles within the mixing vessel 104. Micro mixing of the particles results from particle-to-particle and particle-to-vessel interactions. The partial-to-particle interaction causes micro-mixing that induces diffusion like phenomena and segregation of the particles. The diffusion-like phenomena corresponds to side-to-side exchange of particles, where the segregation corresponds to an up-and-down exchange of particles. Micro-mixing, as well as the bulk mixing, allows for new materials to come into exposure with a fine spray mist output by the sprayer 106. In some implementations, micro-mixing alone will lead to segregated materials within the vessel. The micro-mixing of the particles can contribute to and drive the bulk mixing of the materials. The combination of the micro and bulk mixing of the materials may very rapidly mix the materials and move the entire contents of the mixing vessel through a single or multiple fine spray mists rapidly.

Referring back to FIG. 10A, when spraying into a fluidized bed created under vacuum conditions using the coating systems 100, the coating material 110 introduced by the sprayer 106 can be can be sprayed without exhibiting drag onto the particles.

FIG. 13 shows a second example coating system 100*b*, operated under atmospheric conditions. Instead of a vacuum line 112, the coating system 100*b* includes a vent 118 coupled to the mixing vessel 104 to maintain the atmospheric conditions inside the mixing vessel 104. The vent 118 may be any device or outlet for allowing air into and out of the mixing vessel 104. In another example coating system 100*c*, shown in FIG. 14, the mixing vessel 104 is sealed maintaining an increased pressure within the mixing vessel 104.

FIG. 15 shows a fourth example coating system 100*d*. The coating system 100*d* includes a pressure relief valve 120. The pressure relief valve 120 may be coupled to the mixing vessel 104 and may be used to control the pressure levels in the mixing vessel 104. In some implementations, the pressure relief valve may keep the pressure substantially constant during the spray process. In one implementation, the pressure relief valve 120 is coupled to the top of the mixing vessel 104. In other implementations, the pressure relief valve may be coupled to any side of the mixing vessel 104. The pressure relief valve 120 can be configured to maintain pressures at or above atmospheric pressure.

FIG. 16 shows another example coating systems 100*e*. The coating system 100*e* is similar to the coating system 100*a*. However, the coating system 100*e* also includes a cooling jacket 122 coupled to the mixing vessel 104. The cooling jacket 122 includes a cooling inlet 123*a* and a cooling outlet 123*b*. During operation of the coating system 100*e*, work is being performed on the fluidized materials from mechanical motion caused by particle-to-particle collisions as well as particle interaction with the walls. In some implementations, this work on the fluidized materials may be dissipated as heat. The heat may be unwanted and a cooling mechanism, such as the cooling jacket 122, can be applied around the mixing vessel 104 to keep the material contents at a desired temperature during the process. In some implementations, it may be desirable to carry out the processes at temperatures below room temperatures. The cooling jacket can help achieve this operating condition, too.

In another example coating system 100*f*, shown in FIG. 17, the coating system 100*f* includes a heating jacket 124 coupled to the mixing vessel 104. In some implementations, it may be desirable to maintain an increased temperature in the mixing vessel 104, e.g., to maintain a decreased viscosity of a sprayed-in material, or to facilitate drying of the material. As such, a heating mechanism, such as the heating jacket 124 or band heaters, can be applied around the mixing vessel 104 to keep the material contents at a desired temperature during any process. As with the cooling jacket shown in FIG. 16, the heating jacket 124 can include an inlet 125*a* and an outlet 125*b* for receiving and releasing a heating fluid such as a hot gas or liquid.

FIG. 18 shows a seventh example coating system 100*g*. The coating system 100*g* is similar to coating system 100*a*, but is used for drying applications and includes a gas sweep 126 coupled to the mixing vessel 104. To dry the materials in the mixing vessel 104, a gas, in low volume, may be used for reaction with the solid materials inside the mixing vessel 104. In some implementations, the sweep gas feed 126 may be coupled to top of the mixing vessel 104. In other implementations, the sweep gas feed may be coupled to the any side of the mixing vessel 104. In still another implementation, the sweep gas feed 126 may be coupled to the bottom of the mixing vessel 104. The configuration of coating system 100*g* allows for little to no excess reaction gas to be needed for the fluidization of the particles, because the fluidization is mechanical and does not require a gas, which would be wasted using a traditional gas fluidizer.

FIG. 19 shows another example coating system 100*h* used in drying applications. The coating system 100*h* is similar to coating systems 100*g*, described above, but the sprayer 106 is coupled to the bottom of the mixing vessel 104 instead of the top. The sweep gas feed 126 is coupled to the top of the mixing vessel 104. The sprayer 106 coupled to the bottom of the mixing vessel 104 can introduce the coating material 110 through the bottom of the mixing vessel 104.

FIG. 20 also shows another example coating system 100*i* that can be used in drying applications. The coating system 100*i* includes the sweep gas feed 126 coupled to the bottom of the mixing vessel 104 and the sprayer 106 may be coupled to the top of the mixing vessel 104. In this implementation, the sweep gas may be introduce gas through the bottom of the mixing vessel 104 and under the contents. In other implementations the sweep gas feed 126 may be coupled to any location on the mixing vessel 104. The various placements of the sweep gas feed 126 and the sprayer 106 on the mixing vessel 104 can depend on the type of materials being mixed and the type of coating materials being used. Some materials tend to float to the top of the mixing vessel during mixing and spraying applications, while others tend to sink to the bottom of the mixing vessel 104. To uniformly and evenly mix and coat certain materials it may be desirable to introduce the coating materials and drying gas at different locations and angles.

In some implementations, to accommodate the various sprayer 106 and sweep gas feed 126 configurations, the mixing vessel 104 may include a number of ports at various locations around its exterior. Each port allows for the coupling of a sweep gas line 126 or a sprayer 106. The ports can also be sealed if not in use for a particular application.

Figure 21:
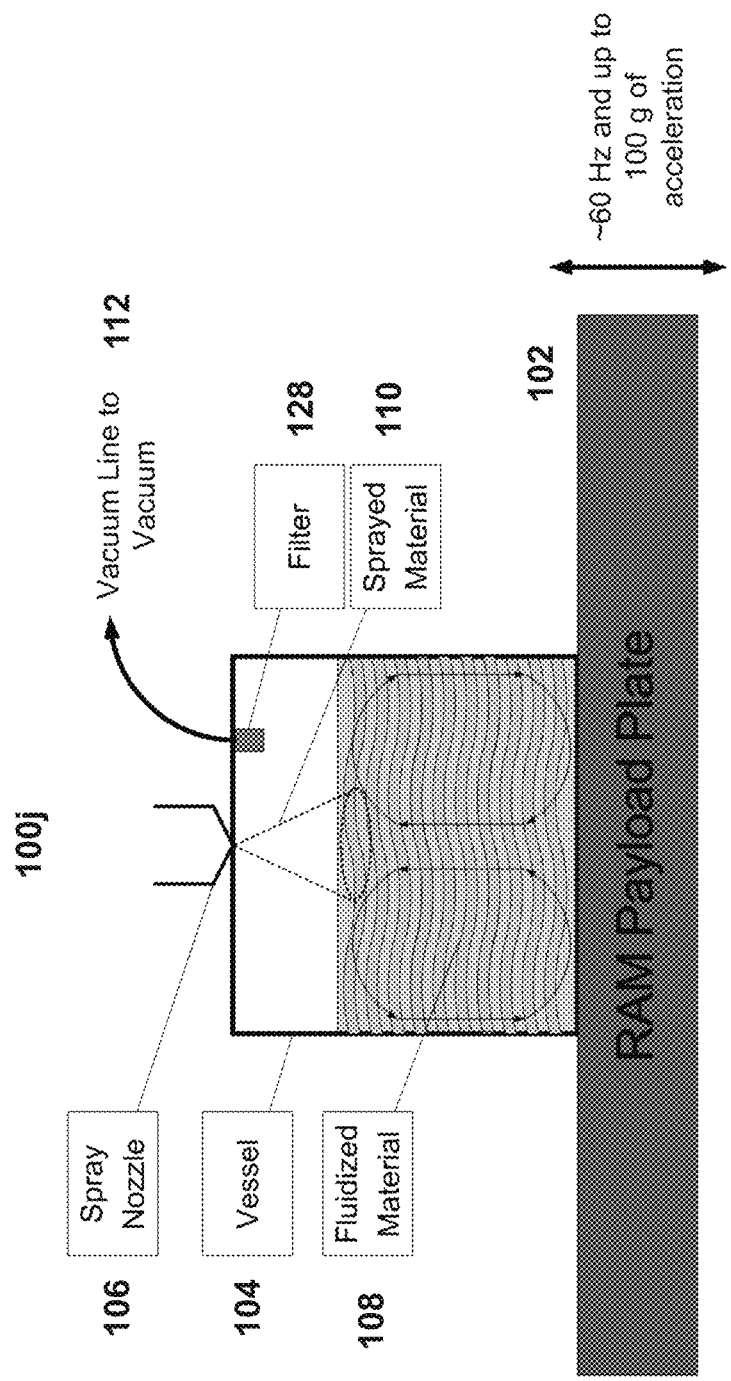
FIG. 21 is another illustrative example of an implementation of a vibratory mixing system.

FIG. 21 shows another example coating system 100*j*. The coating system 100*j* is similar to coating system 100*a*, but the coating system 100*j* includes a filter 128. The filter 128 may be coupled to the vent 118 shown in FIG. 13, the pressure relief valve 120 shown in FIG. 15 or the vacuum line 112 shown in FIGS. 10-12. The filter may block or inhibit unwanted materials from passing through the vent 118, the pressure relief valve 120 or the vacuum line 112 during coating applications.

Figure 22:
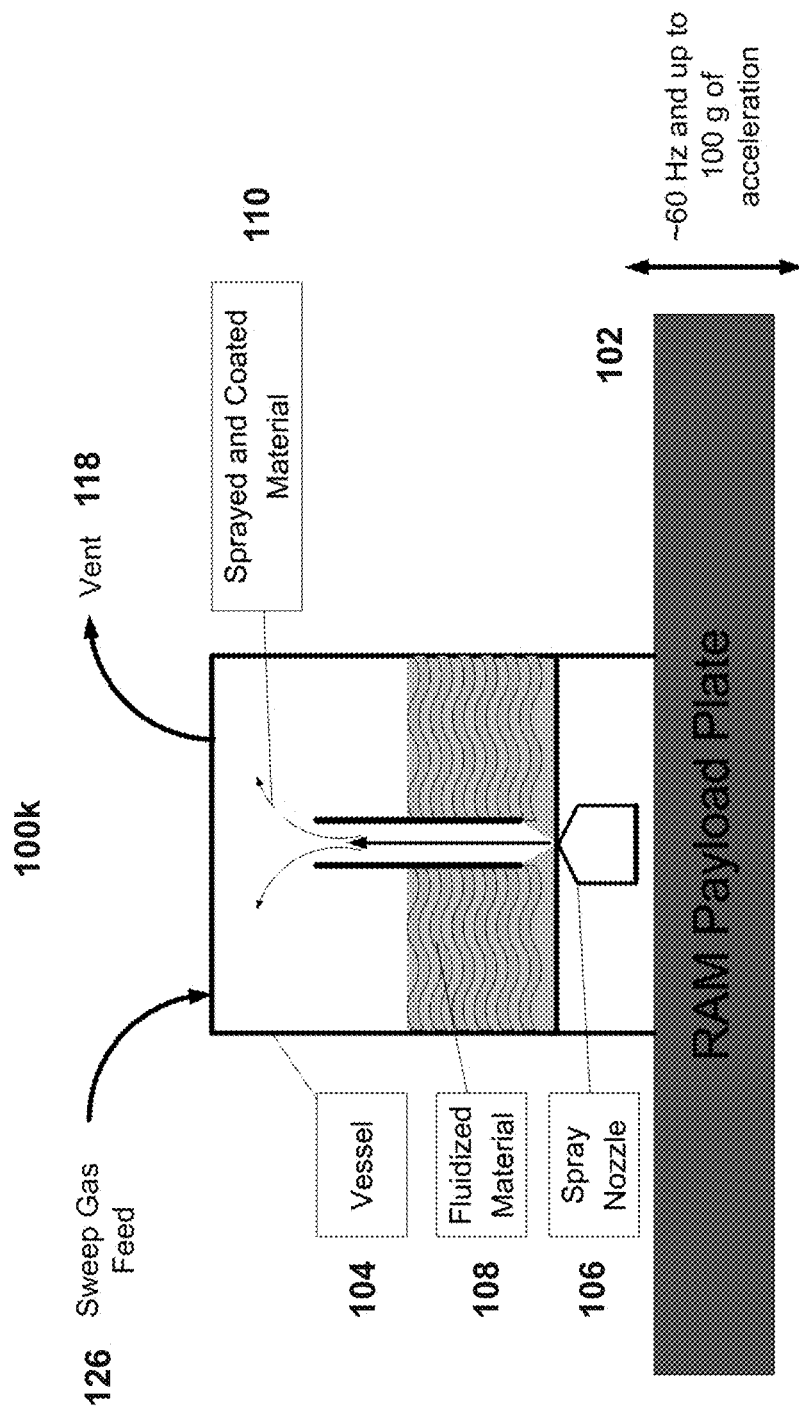
FIG. 22 is another illustrative example of a vibratory mixing system according to a drying application.

FIG. 22 shows an eleventh example coating system 100*k*. The coating system 100*k* can also be used for spraying and drying applications and is configured to introduce coating materials according to the Wurster Method. The coating system 100*k* includes a sprayer 106 coupled to the bottom of the mixing vessel 104, a sweep gas feed 126 coupled to the top of the mixing vessel 104 and a vent 118 coupled to the top of the mixing vessel 104. In the Wurster method the sprayer 106 is located at the bottom of the mixing vessel and introduces the coating material 110 through a nozzle that sprays the coating material 110 above the materials to be coated and allows the sprayed material to fall onto the fluidized bed. The process uses a partition to separate the separated particles that have just been sprayed and those that have been sprayed. The particles dry when they are falling back to the fluidized bed to prevent agglomeration.

Figure 23:
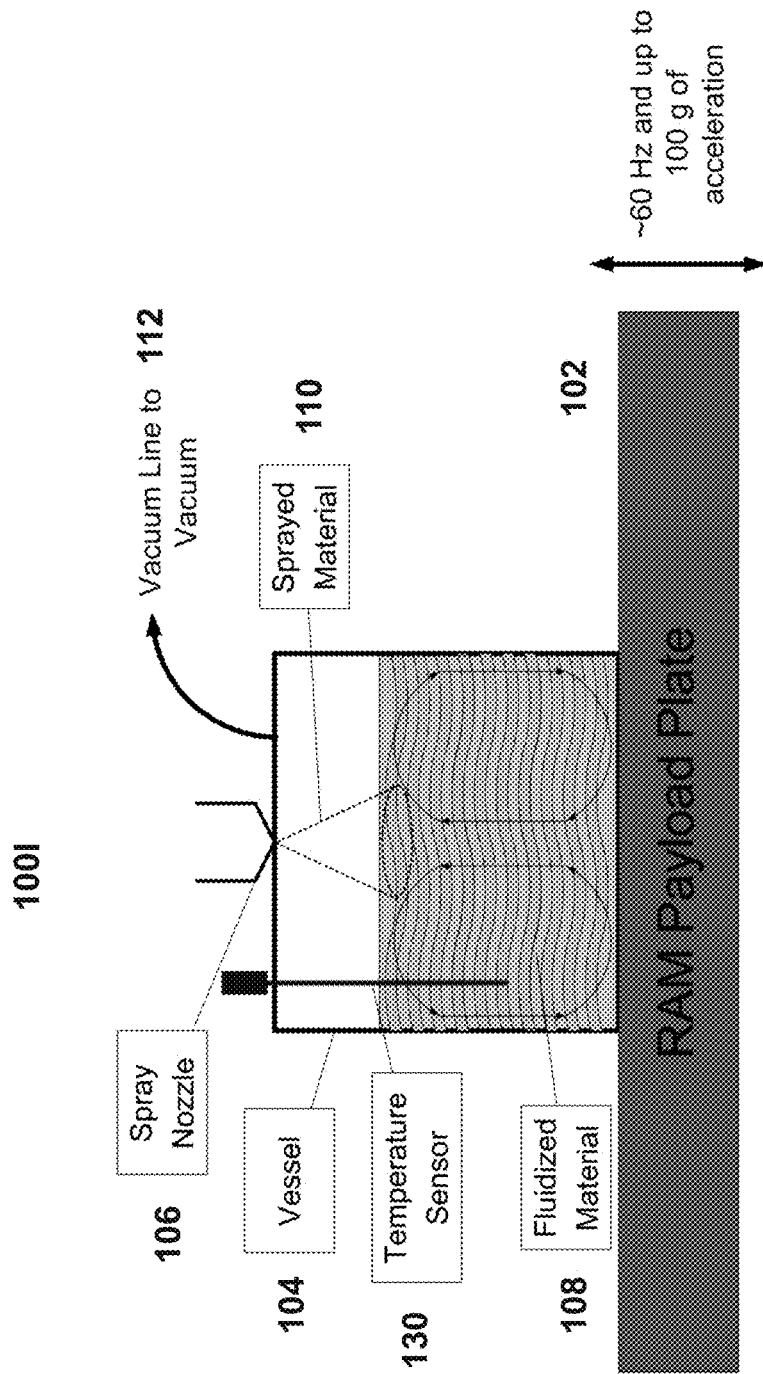
Figure 24A:
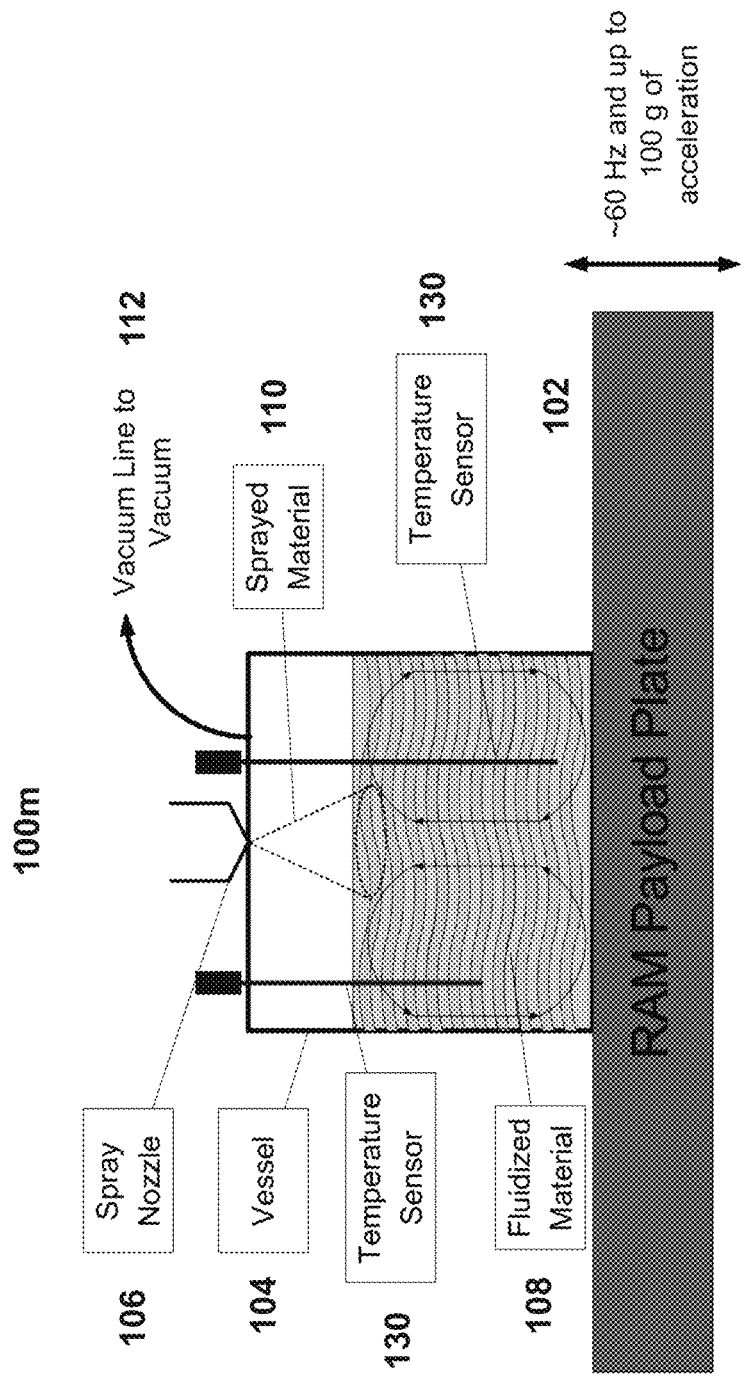

FIG. 23 shows another example coating system 100*l*. The coating system 100*l* is similar to the coating system 100*a*, but includes a temperature measuring device 130. The temperature measuring device 130 may be added to the mixing vessel 104 to monitor the temperature of the materials in the mixing vessel 104. In some implementations, as show in FIG. 24A depicting a coating system 100*m*, a plurality of temperature measuring devices 130 may be applied to the mixing vessel 104. The temperature measuring devices 130 may be applied at different depths and locations to determine if the materials are being uniformly fluidized, mixed or coated. The temperature measuring devices 130 used in the coating systems 100*l* and 100*m* may be any device that measures temperature including temperature sensors, thermocouples, resistance temperature detectors (RTD), thermistor, or infrared detectors.

Figure 24B:
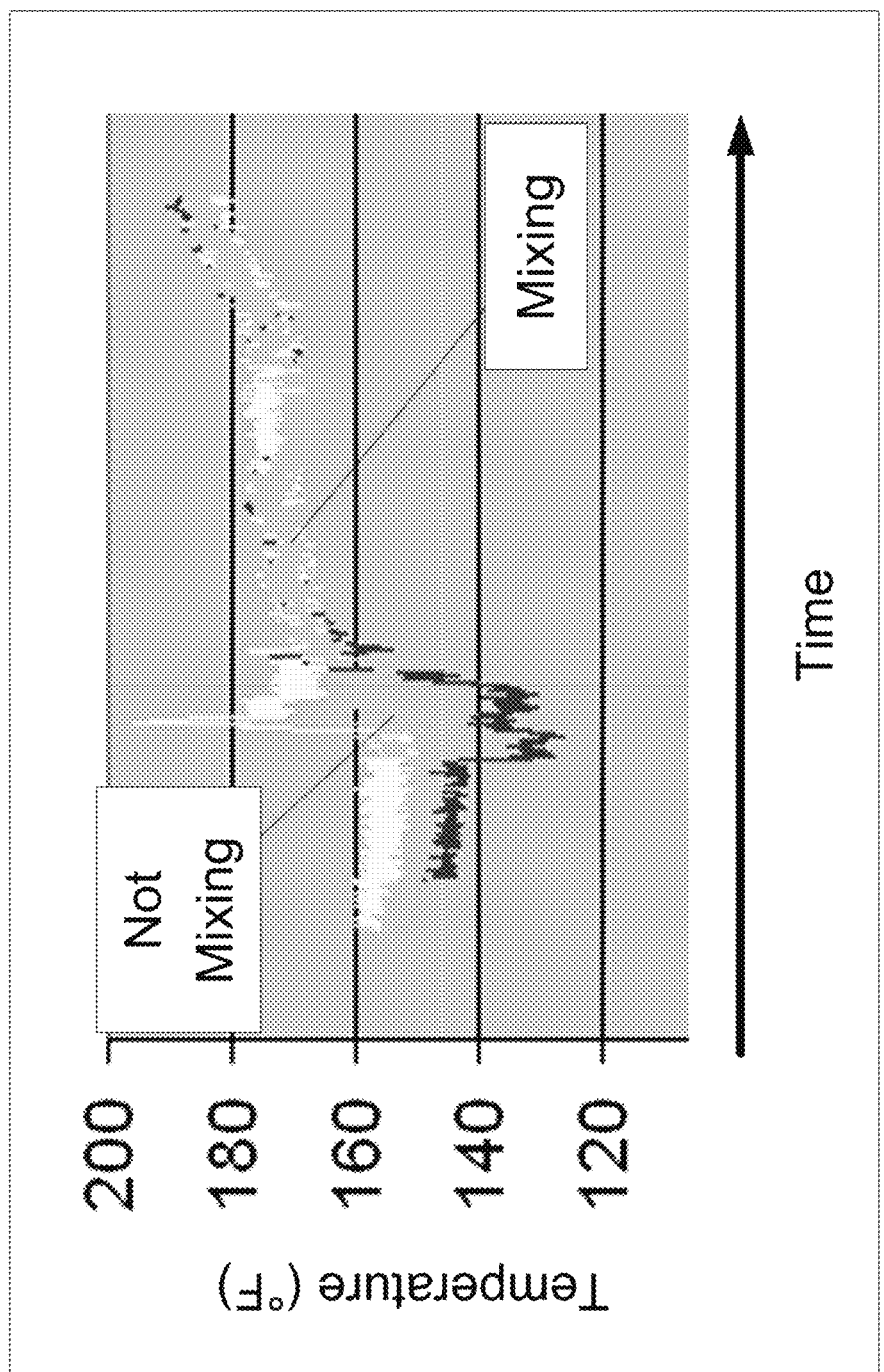
FIG. 24B is a graph of temperature ranges of the materials inside the mixing vessel during operation of the mixing system.

FIG. 24B shows a graph of temperature readings received from the temperature measuring device 130. The readings can be from the coating system 100 or the continuous flow reactor system 200. When the materials are uniformly fluidized or mixed the multiple temperature readings will tend toward each other and be closer in value. When the mixing or fluidizing stops, then the temperatures of the various temperature readers will diverge.

Figure 25:
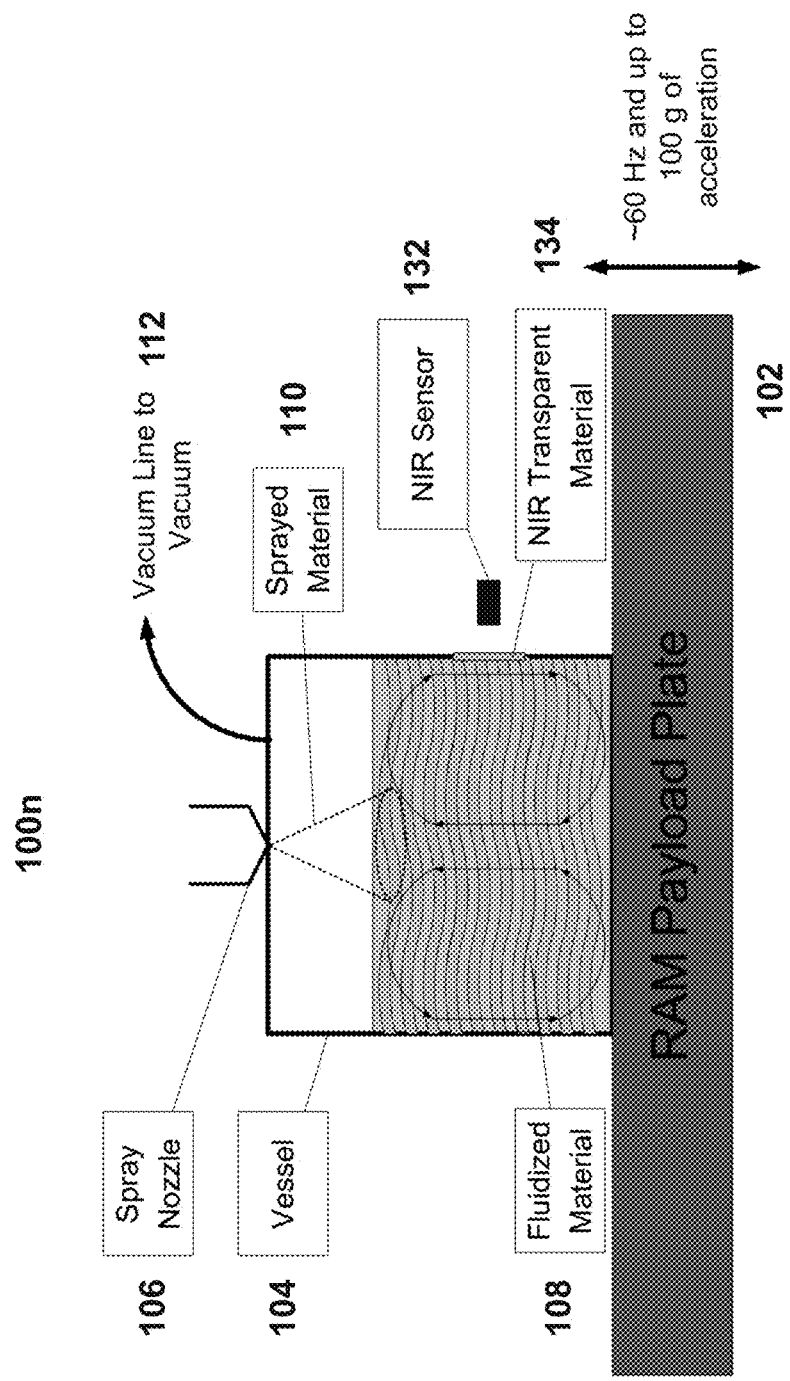
FIGS. 25-33 are illustrative examples of various implementations of a vibratory mixing system.

FIG. 25 shows a fourteenth example coating system 100*n*. Instead of including a temperature measuring device 130 to monitor the process, as show in FIGS. 23 and 24, the coating system 100*n* includes a near-infrared (NIR) mixedness sensor 132. The mixing stages and coating process can be monitored in real-time by the use of detectors such as the NIR sensors 132, such as those available from Goodrich ISR Systems (Princeton, N.J.) that are used to perform a NIR spectroscopy. The NIR sensors 132 can view the materials mixing in the mixing vessel 104 though a NIR transparent material. The NIR spectroscopy can be used to determine mixedness and the current mixing stage of the materials in the mixing vessel 104. The NIR spectroscopy may also determine when the materials are sufficiently coated, wet, dry, or reacted.

Figure 26:
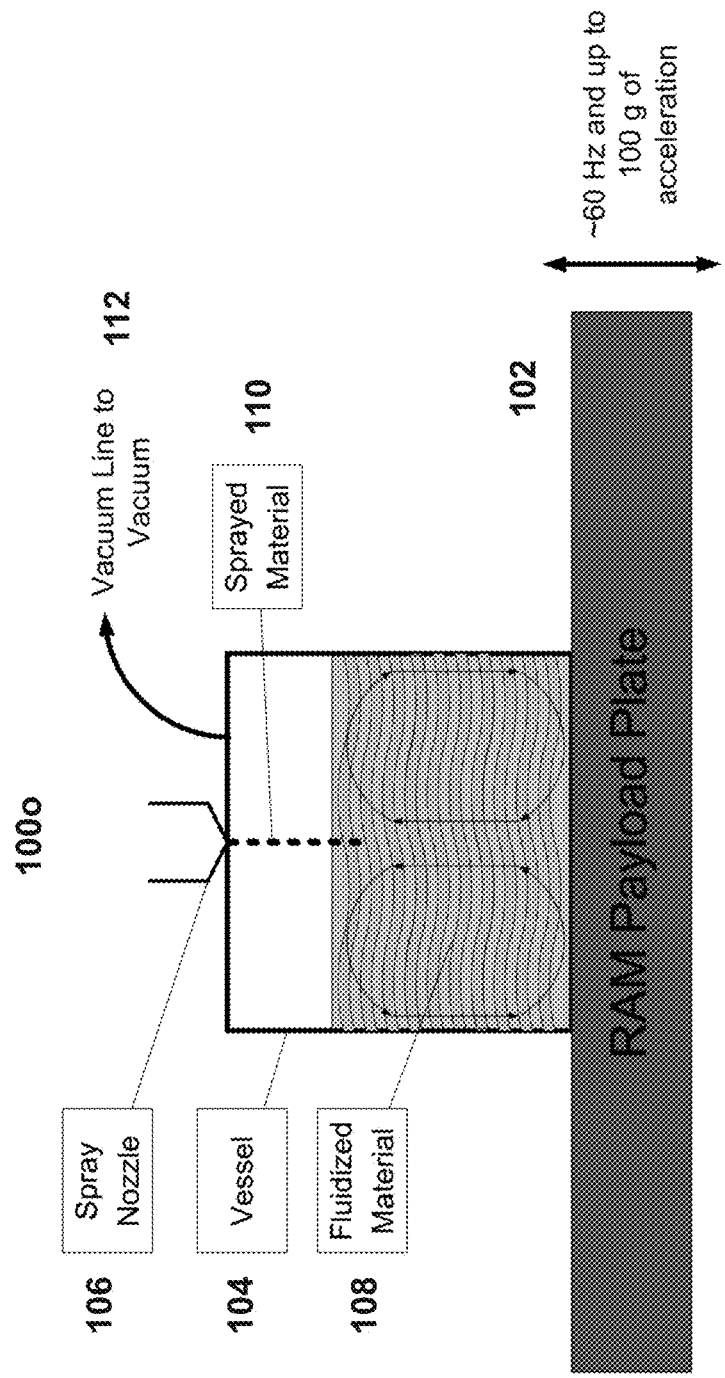

In the many examples of the coating systems 100 described herein, the shape of the nozzle of the sprayer 106 may be of various shapes, for example and without limitation, a cone, ring, and a straight jet. FIG. 26 shows an example coating system 100*o*. The coating system 100*o* is similar to the coating system 100*a*, but includes a sprayer 106 with a straight jet nozzle to introduce coating material 110 onto the fluidized bed in the mixing vessel 104. The type of nozzle chosen for each application can depend on the type of material to be coated and the type of coating material 110 to be used.

Figure 27:
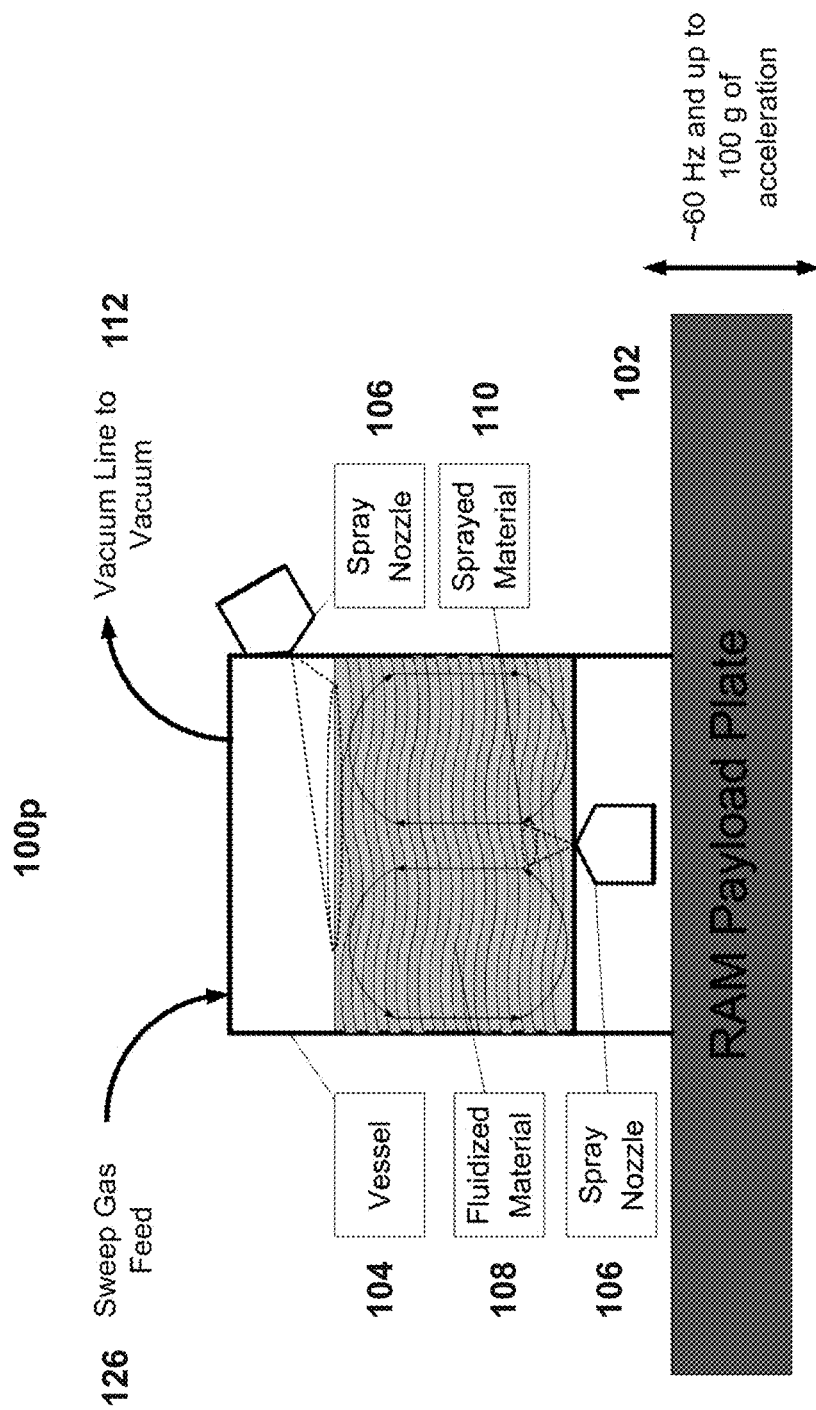
Figure 28:
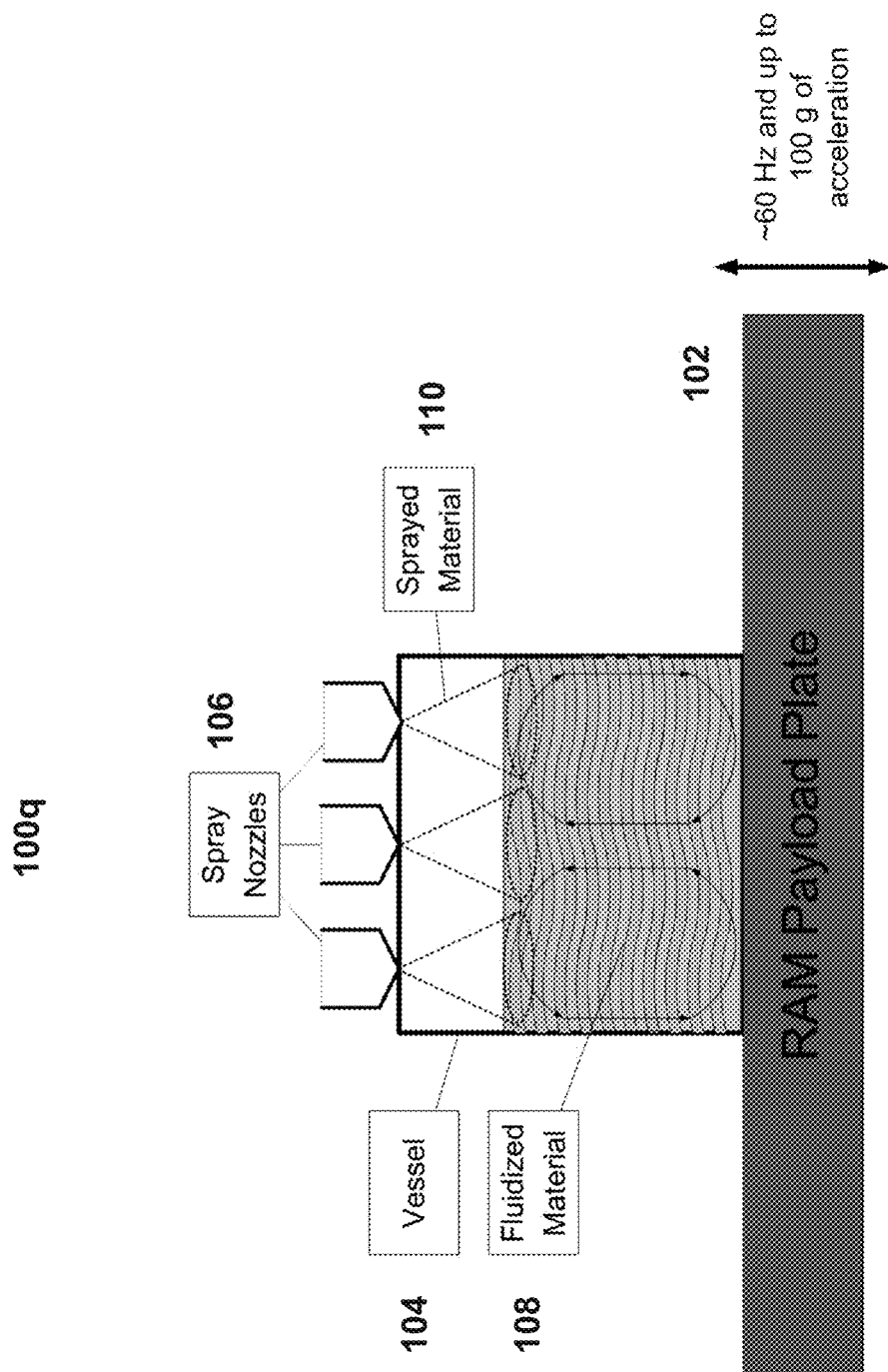

Additionally, the coating systems 100 can have a single sprayer 106 coupled to the mixing vessel 104 or a plurality of sprayers 106 coupled to the mixing vessel 104. The sprayer(s) 106 can also be coupled to the at various angles. FIG. 27 shows an example coating system 100*p*. The coating system 100*p* includes a plurality of sprayers 106 coupled to different locations on the mixing vessel 104, instead of only one sprayer 106 coupled to the top of the mixing vessel 104, as shown in coating system 100*a*. The plurality of sprayers 106 may introduce the coating material 110 into mixing vessel 104 at various locations and angles dependent upon the desired application and materials used. In FIG. 27, a first sprayer 106 is coupled to the side of the mixing vessel 104 to introduce the coating material 110 onto the top of the fluidized bed 108 inside the mixing vessel 104 and a second sprayer 106 is coupled to the bottom of the mixing vessel 104 to introduce a material under the fluidized bed 108. FIG. 28 shows another example coating system 100*q* that includes a plurality of sprayers 106. The coating system 100*q* includes the plurality of sprayers 160 all coupled to the top of the mixing vessel 104.

Figure 29:
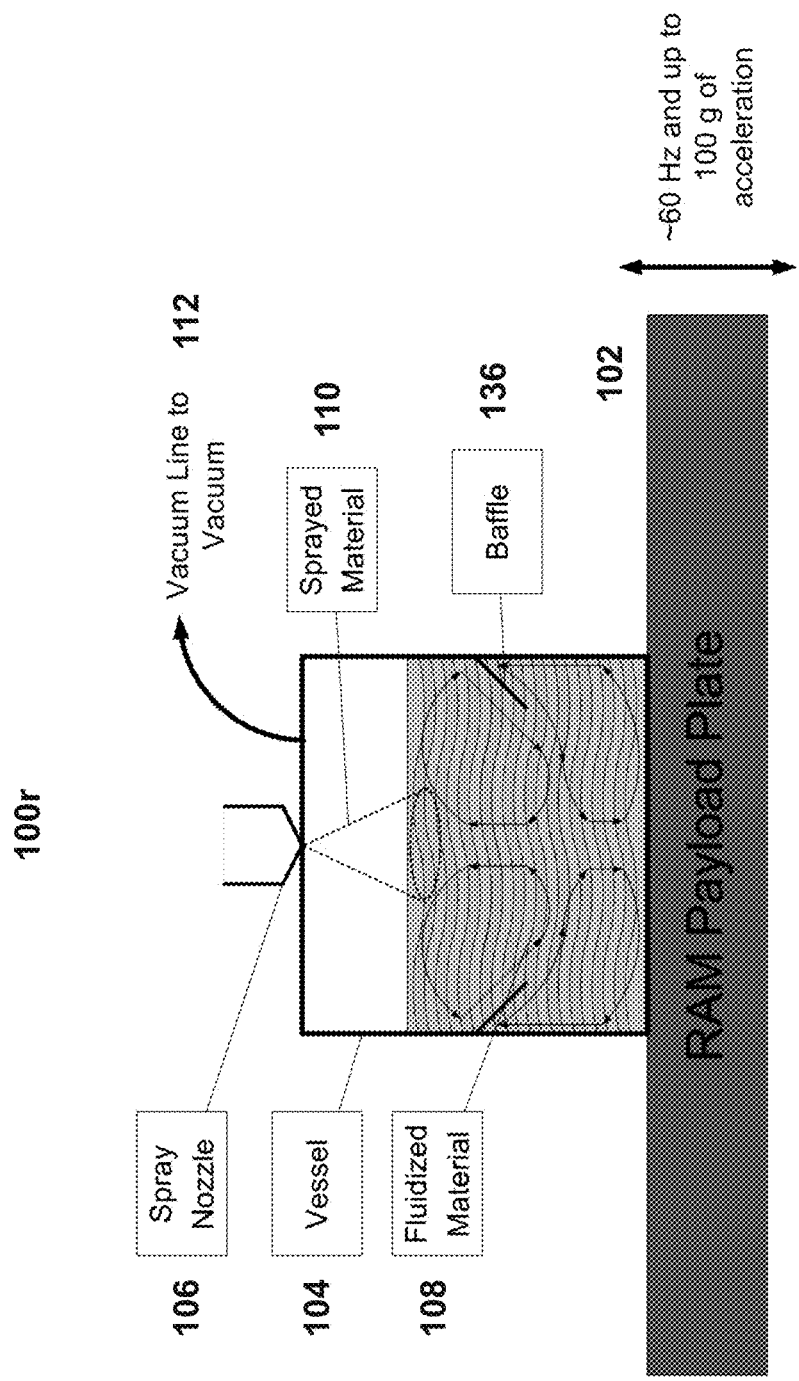
Figure 30:
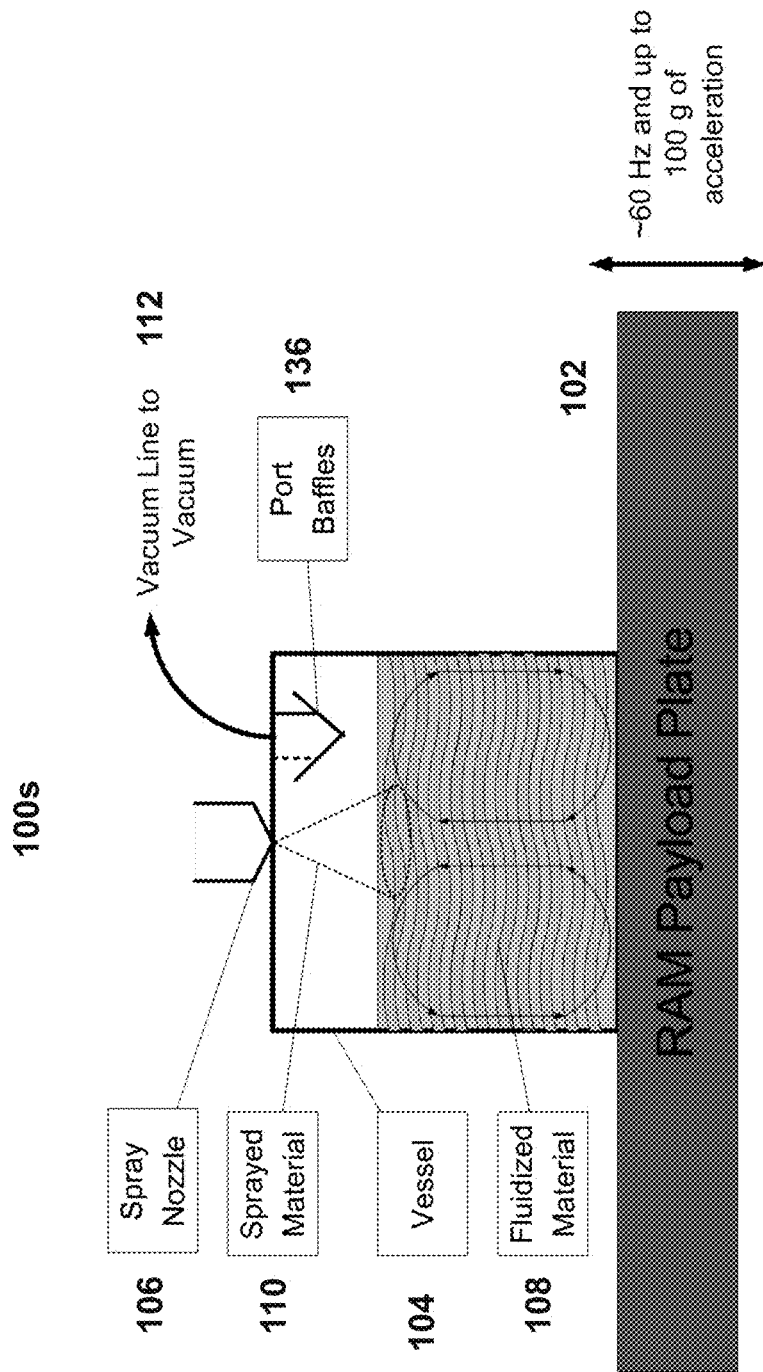

FIG. 29 shows another example coating system 100*r*. The coating system 100*r* is similar to coating system 100*a*, but includes a third material 136 inside the mixing vessel 104 to affect the bulk flow pattern of the fluidized materials. The third material 136 can be any structure to affect, change or direct the bulk flow pattern inside the mixing vessel 104, including a baffle. The third material 136 can also be used to shield mixing vessel 104 ports from coming into contact with material that may splash up during mixing or coating applications. FIG. 30 shows an example coating system 100*s*, which includes a vacuum line 112 with the third material 136 (i.e., port baffles) shielding it. The coating system 100*s* is similar to the coating system 100*r*, but the third material is used to shield the ports on the mixing vessel 104 instead of for altering the mixing patterns within the mixing vessel 104. Similar baffles can also shield ports of the vent 118 and the pressure relief valve 120. In some other implementations, the third material 136 can create a path for materials to flow out of the mixing vessel 104 and out of any of the ports.

Figure 31:
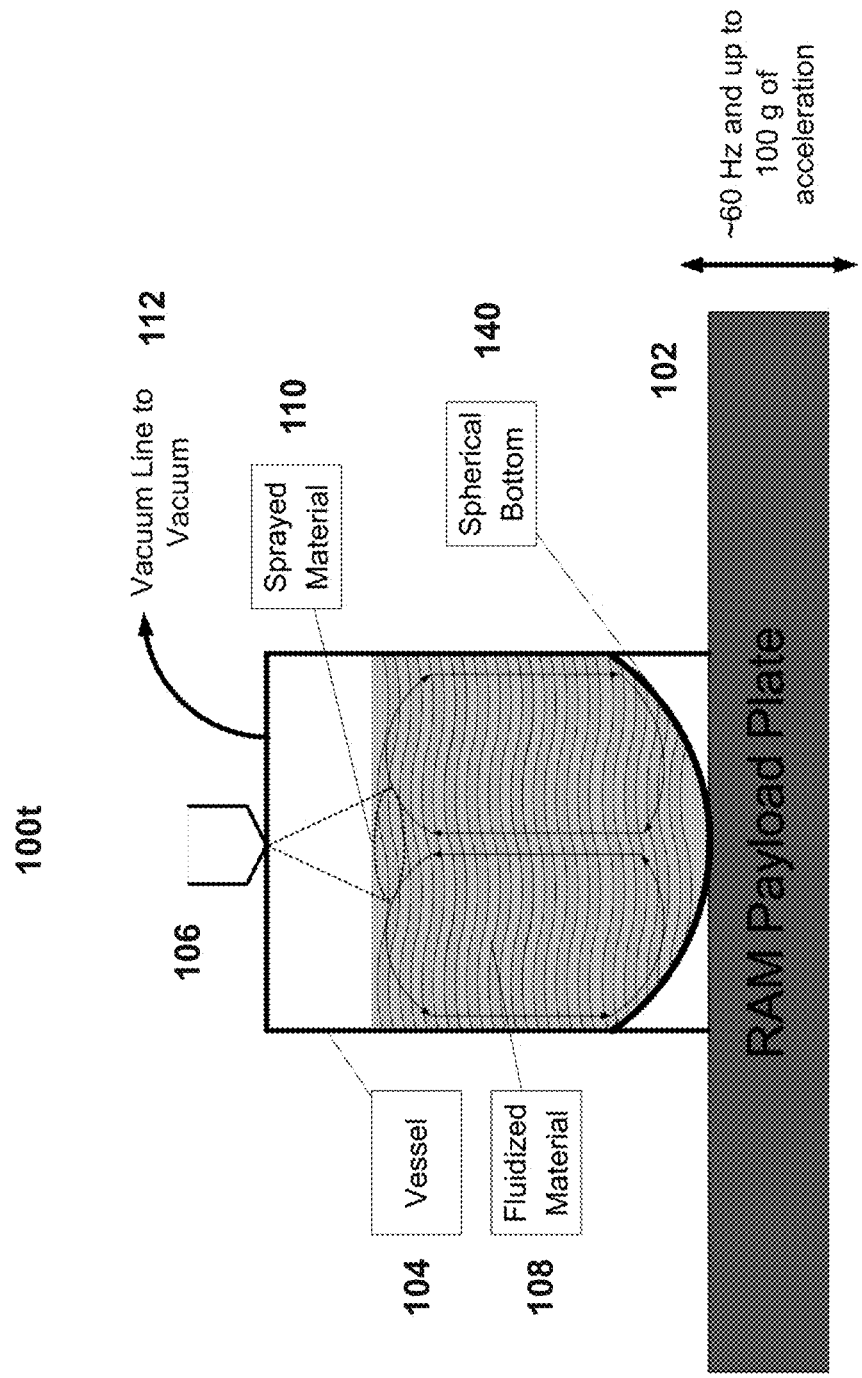
Figure 32:
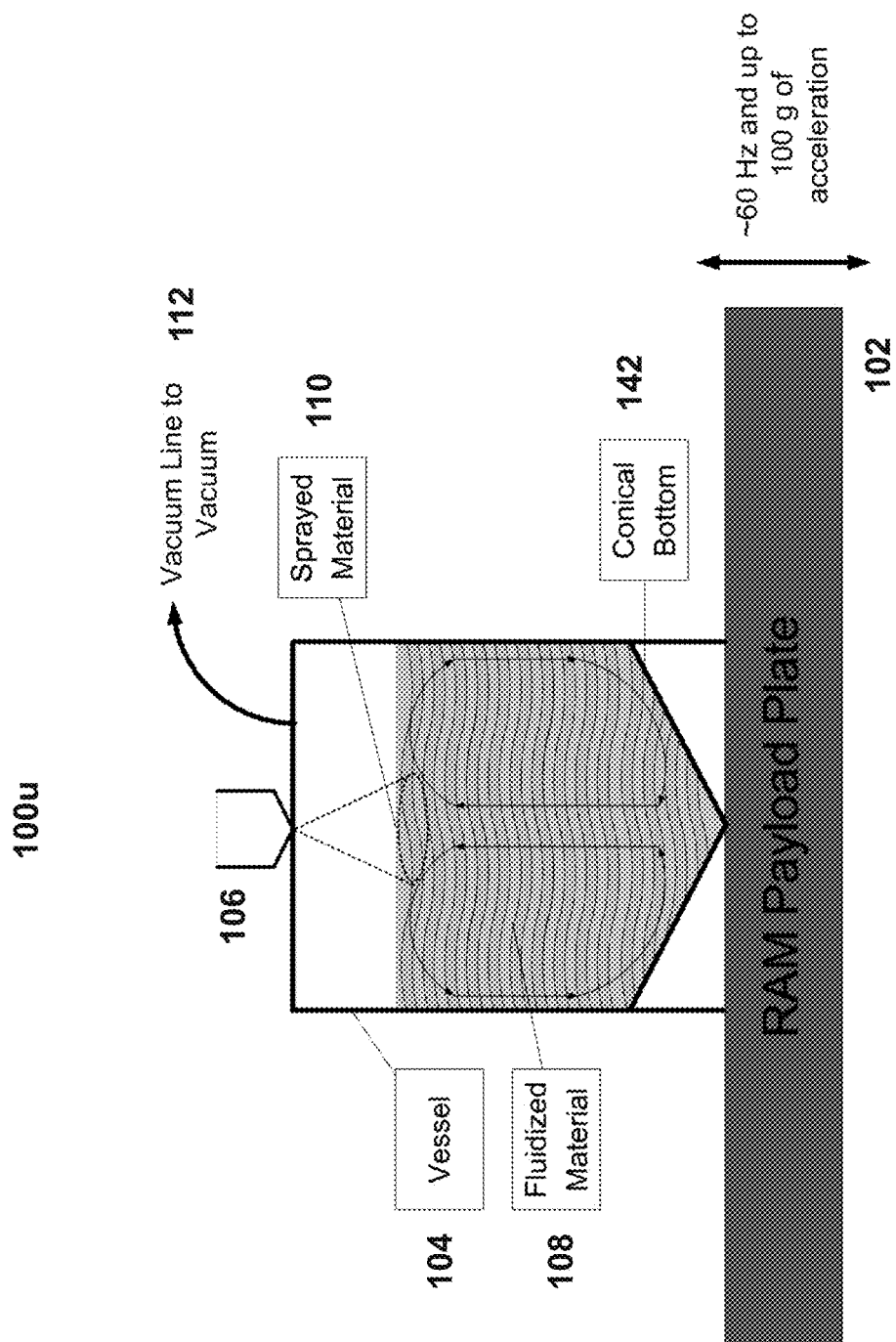

In the many example coating systems 100 described herein, the mixing vessel 104 can be configured in various shapes and forms according to the desired application. FIG. 31 shows another example coating system 100t. The coating system 100t includes a mixing vessel 104 with a spherical bottom 140. Different shapes of the mixing vessel 104 can be used to mitigate dead zones or caking of materials in the mixing vessel 104. In another example coating system 100u, shown in FIG. 32, the mixing vessel 104 can have a generally conical shape 142. The various shapes of the top, walls and bottom of the mixing vessel 104 can also affect the bulk flow patterns and be selected based on a desired bulk flow pattern.

Figure 33:
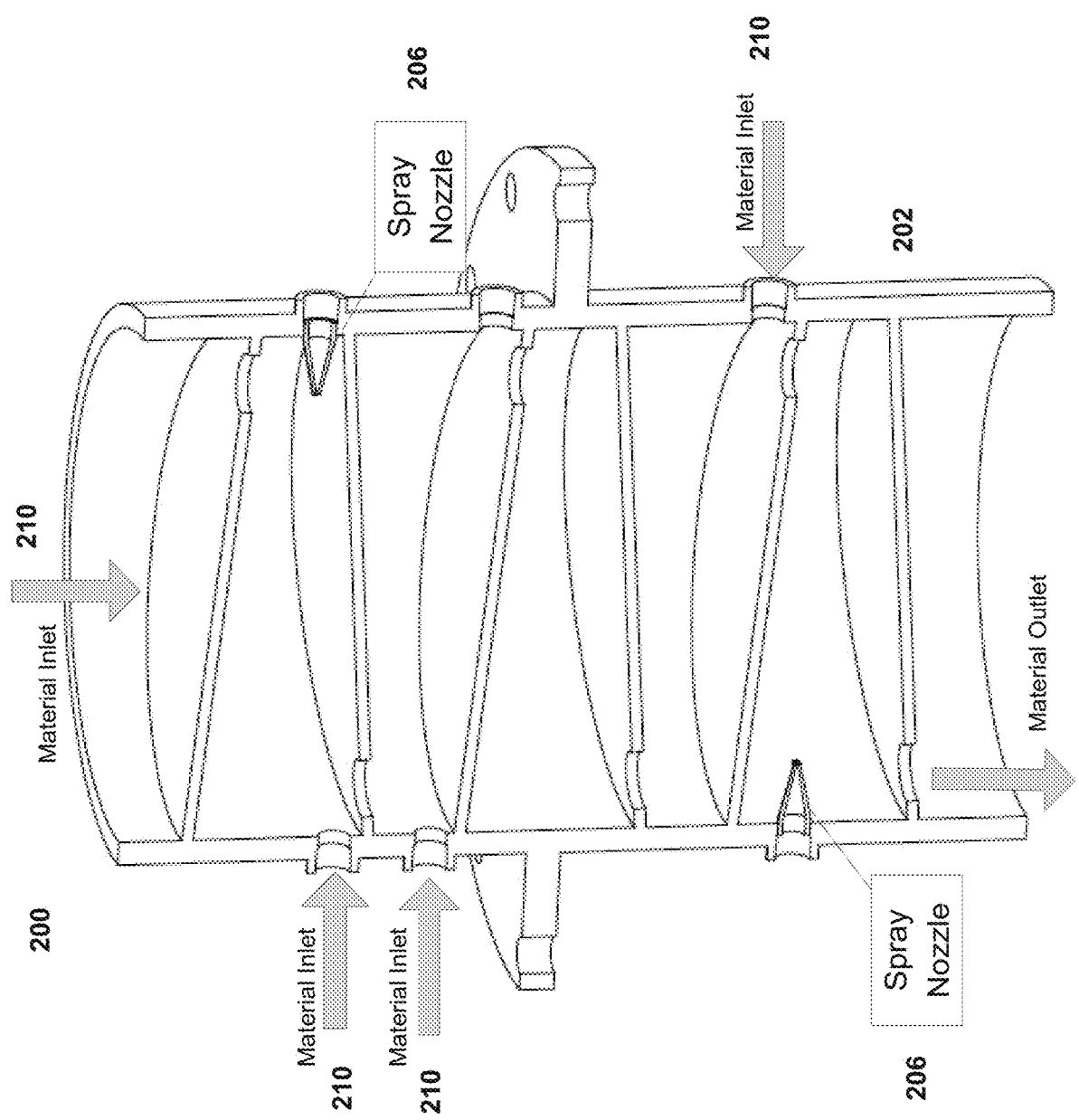

FIG. 33 shows an example continuous flow reactor system 200. The continuous flow reactor system 200 can fluidize powders or materials in a continuous flow reactor 202, while one or more coating materials 110 are applied at various stages. By adding the coating material in a continuous or pulsed fashion while mixing the combined materials, clumps and highly viscous regions can be mitigated. The continuous flow reactor system 200 includes a plurality of sprayers 206 coupled to the sides of the continuous flow reactor 202 and a plurality of material inlets 210 to introduce coating materials 110 at various stages. In some implementations, only one sprayer 206 is coupled to the continuous flow reactor 202. In some implementations, only one material inlet 210 is coupled to the continuous flow reactor 202. The material to be coated can flow through the continuous flow reactor 202 and can be sprayed at various stages by the plurality of spray nozzles 206. Additional coating materials 110 may be added at various stages and after the previous spray process through the material inlets 210. This may be advantageous because some materials may not need all the coatings and may allow for various materials to be added without coatings. The continuous flow reactor system 200 can be applied to many applications, for example and without limitation, mixing, coating, chemical reactions, combining, or segregating materials. Some of the aforementioned applications are described in more detail below.

The coating systems 100 and continuous flow reactor system 200 may be utilized in spray coating operations because they have excellent fluidization characteristics. Coatings are traditionally applied by adding sprayers or nozzles to fluidizers and tumblers. These methods work well for large particles such as tablets. However, when trying to coat smaller particles uniformly, pneumatic fluidizers and tumblers do not adequately create a uniform motion to coat the materials evenly. The coating systems 100 and continuous flow reactor system 200 have excellent fluidization characteristics for use with hard to fluidize materials that include cohesive powders which tend to rat hole and exhibit plug flow if fluidized with standard fluidizers.

As materials become smaller and smaller they tend to become more cohesive. One example category of materials that exhibit this phenomenon includes Pharmaceutical materials which are typically very cohesive. Typical active pharmaceutical ingredients (API) fall within particle size and Geldart groups of powders. The Geldart Groupings of powders was first used by Professor Geldart to describe and characterize different powders on how they fluidize in pneumatic driven fluidizers. Group C powders are powders that are in any way cohesive. It is extremely difficult to fluidize Group C powders using conventional fluidizers such as a pneumatic bed, and a vibratory pneumatic bed because the powders either lift as a plug in small diameter tubes, or channels (rat-holes). Mechanical agitation can be applied to help avoid the aforementioned phenomena, but is not guaranteed to work. Plug flow causes no fluidization and channels only cause local fluidization which are both unwanted for spray coating applications, because without constant uniform turnover of the material, the spray will cause liquid rich zones, that form clumps.

By using a coating system, such as any of the coating systems 100 described above, to uniformly fluidize the material, a sprayer will be able to be used to continuously spray on coating material and avoid the formation of clumps. Because the coating systems 100 does not use pneumatics to form the fluidized bed 108, the spray can be applied under near vacuum conditions.

The coating systems 100 is well suited to create fluidized beds from nano-sized particles to particles the size of tablets. Because the fluidization is formed from only vibration, the coating system 100 can fluidize nano-particles and all sizes of particles up to tablets within its 0 g-200 g acceleration range and operating frequencies from about 50 Hz to about 70 Hz. In one implementation, the payload plate 102 may oscillate at an operating frequency of about 60 Hz. In some other implementations, the payload plate 102 may oscillate up to an operating frequency of 180 Hz. In some implementations, the coating system 100 operates with an acceleration range of up to 100 g.

The sprayer 106 may spray a fluid, powder, or any combination. Because the coating systems 100 doesn't use pneumatics to create the fluidized bed 108, the mixing vessel 104 holding the fluidized bed 108 may be closed or sealed, which allows for small powders, such as nano-materials 110 to be sprayed into the fluidized bed 108 without having the fluidization gasses trying to pull them out of the fluidized bed 108.

In performing chemical reactions the time required and the efficiency are very critical as both cost money. The present disclosure includes a method to mechanically fluidize particles by using the coating systems 100 and coupling a sprayer 106. The sprayer 106 may be used to input a gas or a liquid that will react with the fluidized materials 108. This technology can be used with materials that need to react with a particular gas or liquid material, but will react to air if used as the fluidizing media with conventional fluidizers. With normal gas fluidizers, the reaction gas is used for the reaction as well as for the fluidization, wasting the reaction material. By using a mechanically fluidized medium, such as is produced using the spray coating systems 100 described above, the exact amount of reaction material can be added to the mixing vessel 104. The reactants can then be allowed to react during fluidization without the addition of other materials to create the fluidization, as would be needed using conventional fluidizers. Such other added materials can potentially add contaminants, as well as waste materials that would have normally been reacted, if a sealed vessel was used.

The coating systems 100a can be applied in many applications. Some examples of different industries and application that can benefit from the technology are described in below.

Spray Coating and Drying

In a first example, the coating systems 100a can be used in spray coating and drying applications, including the food, pharmaceutical, and industrial industry. Traditional spray dryers are used in many industries, but the main industries are food, pharmaceutical, and industrial. Some examples use cases in each industry include the production of milk powder, coffee, tea, cereal, and spices for the food industry; antibiotics, medical ingredients, and additives for the pharmaceutical industry; and paint pigments and ceramic materials for the industrial industry. Spray drying applications may use similar if not the same equipment as specified previously for coating applications.

Another well-known coating method in Pharmaceuticals is the Wurster method. The method uses a nozzle to spray a material onto particles that have been separated from each other with a higher velocity gas stream than is used to fluidize the particles. The process uses a partition to separate the separated particles that have just been sprayed and those that have been sprayed. The particles dry when they are falling back to the fluidized bed to prevent agglomeration.

Typical problems with the above systems is that they do not produce uniform fluidization and flow of the materials being coated and dried. This causes non-uniform coating and clumps of liquid rich materials, both of which are unwanted. The fluidization process employed by coating systems 100 described above can mitigate this process. The coating systems 100 fluidize materials ranging from nano-sized powder particles up to tablet-sized particles.

Figure 34:
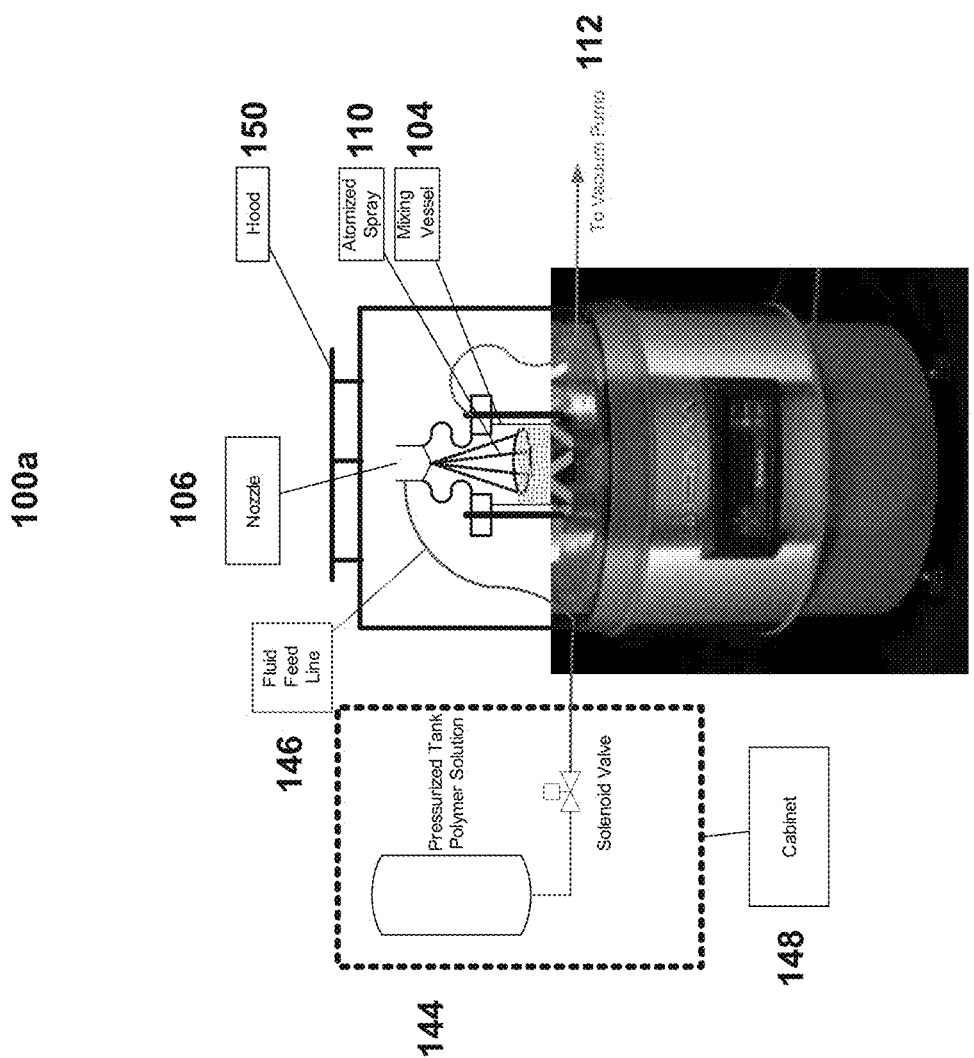
FIG. 34 is one implementation of a vibratory mixer-based spray coating.

FIG. 34 shows an example application of the coating system 100a. More particularly, FIG. 34 shows an expanded view of the coating system 100a used for the coating of a sample API, in this case ibuprofen. In addition to the components of the coating system 100a shown in FIG. 10A, FIG. 34 also shows a feed line 146 from a tank 144 holding the coating material 110. The tank 144 is coupled to a cabinet 148 to provide controls for the tank 144. A hood 150 is shown in FIG. 34 to protect the sprayer 106 introducing the coating material 110 and provide a shield over the coating system 100a. Additionally, FIG. 34 shows the vacuum feed 112 coupled to the mixing vessel 104.

Figure 35:
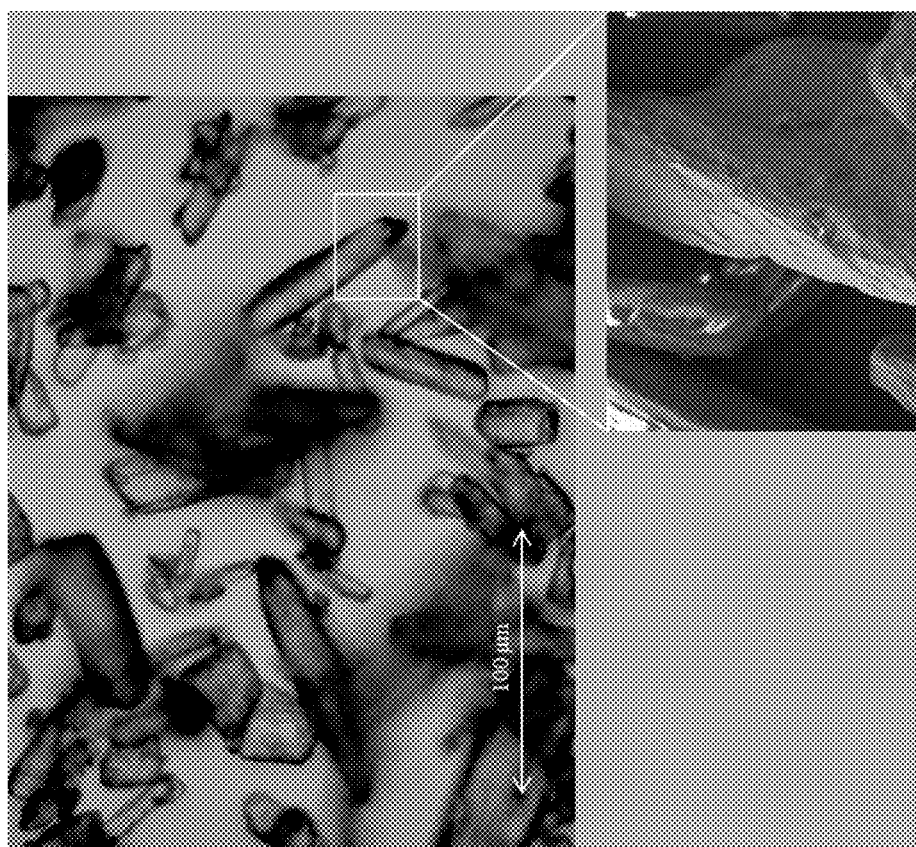
FIG. 35 is a picture of an uncoated API material coated by traditional techniques.
Figure 36:
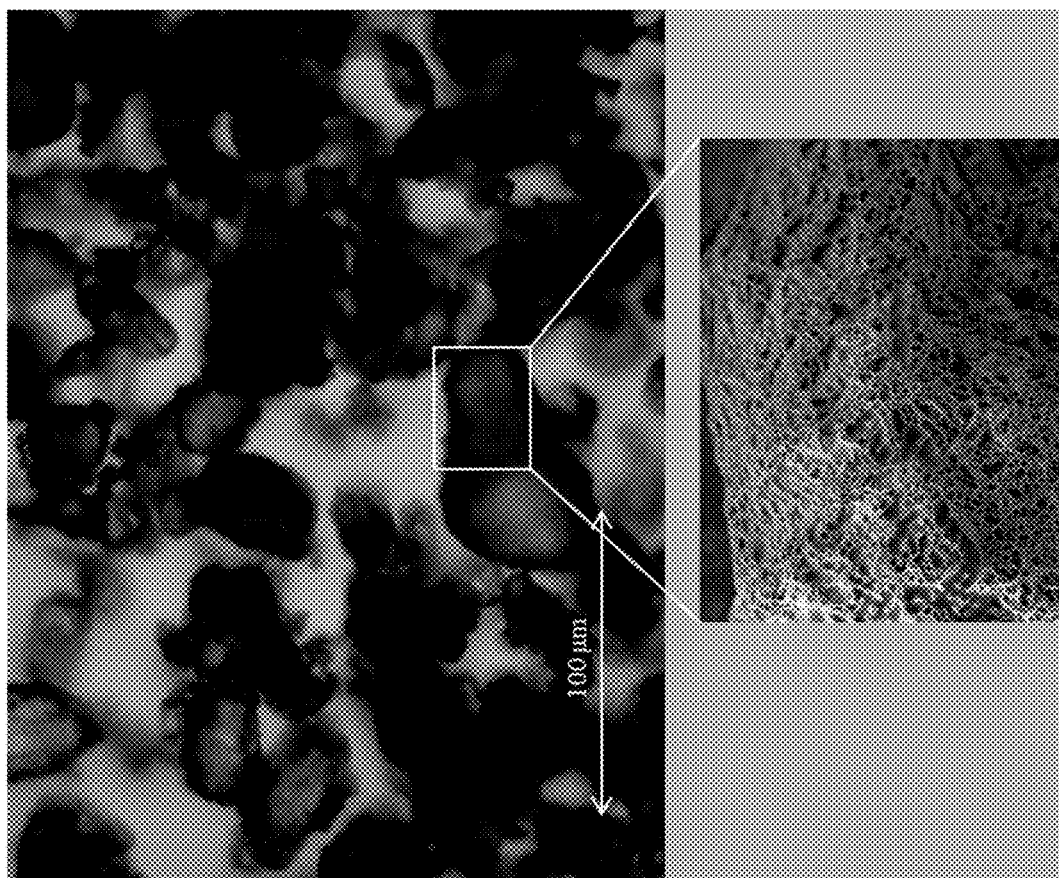
FIG. 36 is a picture of a coated API material coated by the vibratory based spray coating system.

In one experiment, a sample API material (ibuprofen) was coated with a polymer (Ibuprofen 70, BASF Corporation, Bishop Tex.). A picture of API material coated by a traditional spray drying system is displayed in FIG. 35, with an optical microscope picture and a SEM image in the lower right. The traditional spray drying system coated the API material around the diameter, but the ends were left uncoated and agglomerations of many particles were formed. By using the coating system shown in FIG. 34, the ibuprofen crystals were coated with the polymer and the ends were also coated. The coated particles also did not agglomerate. A picture of the coated ibuprofen using an optical microscope is displayed in FIG. 36 and an SEM image is displayed in the lower right.

Spray Misting Applications

In a second first example, the coating systems 100 can be used in a spray misting application to combine finely dispersed liquids into solids (powders) to make a paste. It is well known in baking that if all liquids are added to solids (powders) and then mixed, the end result will likely have clumps of dry powder or highly viscous regions. By adding the liquid in a continuous additions or pulsed additions while mixing the clumps and highly viscous regions can be mitigated.

The coating systems 100 are designed for batch mixing. All of the dry materials can be added into the mixing vessel 104 prior to being mixed. In some implementations, by adding a nozzle to the mixing vessel 104, liquids may then be added by pulses or through a continuous flow into the mixing vessel 104 while the mixing is being performed and mitigate the clumps or highly viscous regions. The flow rate, nozzle type, number of nozzles, location of nozzle(s), intensity of mixing, as well as many other system and material properties may affect the mixture and the mixing outcome.

In mixing high viscous liquids with powders, the high viscous material may not flow or mix appropriately. In the present disclosure utilizing the coating systems 100, powder may be mixed in a mixing vessel 104 vessel and the high viscous material may be added through a sprayer 106. The powder is then mixed with the high viscous material.

In a third example, the coating system 100a can be used to combine finely dispersed solids (powders) into liquids to make a paste. When trying to mix liquids and solids together, if all the ingredients are added into the mixer all at one time the solids may become coated by the liquid and stay in unmixed dry clumps. The dry clumps can be broken up with enough shear, but some powders are very shear sensitive and if these clumps form, then the particles will break during the breakage of the clumps. Through diffusion, liquid can permeate into the dry clumps over time, which typically makes the clumps much harder and more difficult to break up. When wetted, hard clumps are formed using shear sensitive powders, damage will occur if these clumps are broken up after they are formed. Therefore, when using shear sensitive materials it is important to avoid forming clumps when mixing. In one implementation of the present system, by adding the powders slowly while the liquid is mixing, the coating systems 100 may mix the powder into the liquid without forming clumps.

Spray Coating of Liquids with Powder Applications

In a fourth example, the coating systems 100a can be used for spray coating of liquids with powders, such as in the cosmetics industry. In the cosmetics industry, fine droplets of liquids covered with powder are used to put on foundation. The droplets are shear sensitive in that the droplets act like a powder because they are coated with powder until there is enough shear to free the liquid from its powder coating. Thus, when the powder coated liquid is applied as a powder, it smears onto the skin like a cream. In another implementation of the present disclosure, a method to make the material includes spray coating a liquid with a powder, by spraying a fine mist of droplets into a fluidized bed of powder created by the coating systems 100. The vessel can have a full or partial vacuum, which will make the droplets tend to stay apart and not join into larger particles during the spraying process. Each droplet will permeate the powder-fluidized bed and become coated before the later introduced liquid droplets have a chance to catch up and join with the droplets.

Spray Coating of Powders onto Powder

In a fifth example, the coating systems 100a can be used for spray coating of powders onto powders. This technology may be applied in the polymer industry where materials are alloyed. The materials that are alloyed need to all be fed into a polymer extruder at a constant material constituent rate or else the polymer material will vary in material and mechanical properties. Many of the alloying materials are of small amounts and can be of small particle size. The coating systems 100 can be used to coat the smaller amounts of alloying materials onto the parent material with the use of sprayers 106, spraying the alloying material onto a fluidized bed 108 of parent material. This allows the correct amount of material to be fed into the extruder to compound the alloying material.

Additionally, this technology can also be applied to the pharmaceutical industry in adding small amounts of API to a parent material. The technology can also be extended to use in the coloring industry as well as the food and spice industries.

While the disclosure has been disclosed in connection with the embodiments shown and described in detail, various modifications and improvements thereon will become readily apparent to those skilled in the art. Accordingly, the spirit and scope of the present disclosure is to be limited only by the following claims.

What is claimed is:

1. A system for mixing a plurality of materials, comprising:
   a mixing vessel configured for holding a first material therein;
   a vibratory mixer configured to oscillate at a range of about 50 Hz to about 70 Hz with a displacement amplitude of about 0.02 inches to about 0.5 inches, thereby generating a fluidized bed of the first material in the mixing vessel at a location, the vibratory mixer including a payload plate having a plane and configured to oscillate an entirety of the mixing vessel in a substantially linear direction perpendicular to the plane of the payload plate; and
   at least one spray nozzle configured for introducing a second material into the mixing vessel at the location.

2. The system of claim 1, wherein the mixing vessel is sealed to maintain the pressure therein.

3. The system of claim 1, wherein the at least one spray nozzle is coupled directly to at least one of a top portion, a side portion, or a bottom portion of the mixing vessel.

4. The system of claim 1, wherein the mixing vessel is further configured to mix the first and second material in a bulk flow pattern.

5. The system of claim 4, wherein the bulk flow pattern comprises micro mixing of the first material and the second material.

6. The system of claim 1, further comprising a sweep gas feed line configured to introduce a drying gas into the mixing vessel.

7. The system of claim 1, further comprising a mixedness sensor configured to detect mixedness of the first material and the second material in the mixing vessel.

8. The system of claim 1, further comprising a filter coupled to at least one of a vent, a pressure relief valve, or a vacuum line, and configured to block an unwanted material from passing therethrough.

9. The system of claim 1, further comprising a cooling jacket coupled to the mixing vessel and configured to cool the mixing vessel.

10. The system of claim 1, further comprising a heating mechanism coupled to the mixing vessel and configured to heat the mixing vessel.

11. The system of claim 1, further comprising a temperature sensor coupled to the mixing vessel and configured to detect a temperature of at least one of the first or the second material in the mixing vessel.

* * * * *